United States Patent
Sirpal et al.

(10) Patent No.: US 8,527,892 B2
(45) Date of Patent: Sep. 3, 2013

(54) METHOD AND SYSTEM FOR PERFORMING DRAG AND DROP OPERATIONS ON A DEVICE VIA USER GESTURES

(75) Inventors: Sanjiv Sirpal, Oakville (CA); Paul Reeves, Oakville (CA); Alexander de Paz, Burlington (CA); Jared Ficklin, Austin, TX (US); Denise Burton, Austin, TX (US); Gregg Wygonik, Austin, TX (US)

(73) Assignee: Z124, George Town (KY)

( * ) Notice: Subject to any disclaimer, the term of this patent is extended or adjusted under 35 U.S.C. 154(b) by 0 days.

(21) Appl. No.: 13/247,949

(22) Filed: Sep. 28, 2011

(65) Prior Publication Data

US 2012/0084694 A1 Apr. 5, 2012

Related U.S. Application Data

(60) Provisional application No. 61/539,884, filed on Sep. 27, 2011, provisional application No. 61/458,150, filed on Nov. 17, 2010, provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
*G06F 3/00* (2006.01)

(52) U.S. Cl.
USPC ............................ 715/769; 715/702; 715/709

(58) Field of Classification Search
USPC .......................................... 715/769, 702, 709
See application file for complete search history.

(56) References Cited

U.S. PATENT DOCUMENTS

| | | | |
|---|---|---|---|
| 6,545,669 B1 | 4/2003 | Kinawi et al. | |
| 7,002,557 B2 * | 2/2006 | Iizuka et al. | 345/173 |
| 7,058,901 B1 | 6/2006 | Hafey et al. | |
| 7,663,607 B2 * | 2/2010 | Hotelling et al. | 345/173 |
| 7,667,692 B2 * | 2/2010 | Marcus et al. | 345/169 |
| 7,705,799 B2 * | 4/2010 | Niwa | 345/1.1 |
| 7,770,136 B2 * | 8/2010 | Beeck et al. | 715/863 |
| 7,883,460 B2 * | 2/2011 | Uchimura et al. | 600/146 |
| 2005/0264540 A1 * | 12/2005 | Niwa | 345/173 |
| 2006/0097991 A1 * | 5/2006 | Hotelling et al. | 345/173 |
| 2006/0110203 A1 * | 5/2006 | Grafton | 400/489 |
| 2007/0257890 A1 * | 11/2007 | Hotelling et al. | 345/173 |
| 2008/0122796 A1 * | 5/2008 | Jobs et al. | 345/173 |
| 2008/0309632 A1 * | 12/2008 | Westerman et al. | 345/173 |
| 2009/0138800 A1 * | 5/2009 | Anderson et al. | 715/702 |
| 2009/0187842 A1 | 7/2009 | Collins et al. | |

(Continued)

OTHER PUBLICATIONS

"Lapdock™ for Motorola ATRIX," at http://www.motorola.com/Consumers/US-EN/Consumer-Product-and-Services/Mobile . . . , accessed Apr. 18, 2011, 1 page.

(Continued)

*Primary Examiner* — David Phantana Angkool
(74) *Attorney, Agent, or Firm* — Sheridan Ross P.C.

(57) ABSTRACT

A multi-screen user device and methods for performing a drag and drop operation using finger gestures are disclosed. A first finger gesture is used to select a display area from which data is to be copied. Subsequently, a drag finger gesture is used to identify where the data that is to be pasted. The drag may extend across a non-display boundary between a first and second display screen of the multi-screen device.

20 Claims, 26 Drawing Sheets

(56) References Cited

U.S. PATENT DOCUMENTS

| | | | |
|---|---|---|---|
| 2009/0259967 A1 | 10/2009 | Davidson et al. | |
| 2010/0056222 A1 | 3/2010 | Choi et al. | |
| 2010/0083154 A1 | 4/2010 | Takeshita | |
| 2010/0085274 A1 | 4/2010 | Kilpatrick, II et al. | |
| 2011/0055703 A1* | 3/2011 | Lundback et al. | 715/727 |
| 2011/0057907 A1* | 3/2011 | Kim et al. | 345/175 |
| 2011/0060986 A1* | 3/2011 | Yang | 715/702 |
| 2011/0141043 A1* | 6/2011 | Soubrie | 345/173 |
| 2012/0081317 A1 | 4/2012 | Sirpal et al. | |

OTHER PUBLICATIONS

"Motorola ATRIX 4G Laptop Dock Review," at http://www.phonearena.com/reviews/Motorola-ATRIX-4G-Laptop-Dock-Review_id2667, Mar. 2, 2011, 6 pages.

Burns, C., "Motorola ATRIX 4G Laptop Dock Review," at http://androidcommunity.com/motorola-atrix-4g-laptop-dock-review-20110220/, Feb. 20, 2011, 5 pages.

Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.

Google images, accessed Apr. 18, 2011, 6 pages.

Harman03, "Kyocera Echo Dual-screen Android Phone," posted 4 weeks from Apr. 18, 2011, 3 pages.

Stein, S., "How does the Motorola Atrix 4G Lapdock compare with a laptop?" Crave—CNET, at http://news.cnet.com/8301-17938_105-20031251-1.html, Feb. 9, 2011, 7 pages.

Website entitled, "Kyocera Echo," at http://www.echobykyocera.com/, 2011, 6 pages.

Website entitled, "Sony Tablet," at http://store.sony.com/webapp/wcs/stores/servletlCategoryDisplay?catalogid=10551&storeid=10151&langid=-1&categoryid=8198552921644795521, 2011, 3 pages.

International Search Report and Written Opinion for International (PCT) Patent Application No. PCT/US11/53951, mailed Feb. 21, 2012, 9 pages.

International Search Report and Written Opinion for International (PCT) Patent Application No. PCT/US11/53960, mailed Feb. 27, 2012, 8 pages.

International Preliminary Report on Patentability for International (PCT) Patent Application No. PCT/US2011/053951, mailed Apr. 11, 2013 8 pages.

International Preliminary Report on Patentability for International (PCT) Patent Application No. PCT/US2011/053960, mailed Apr. 11, 2013 7 pages.

* cited by examiner

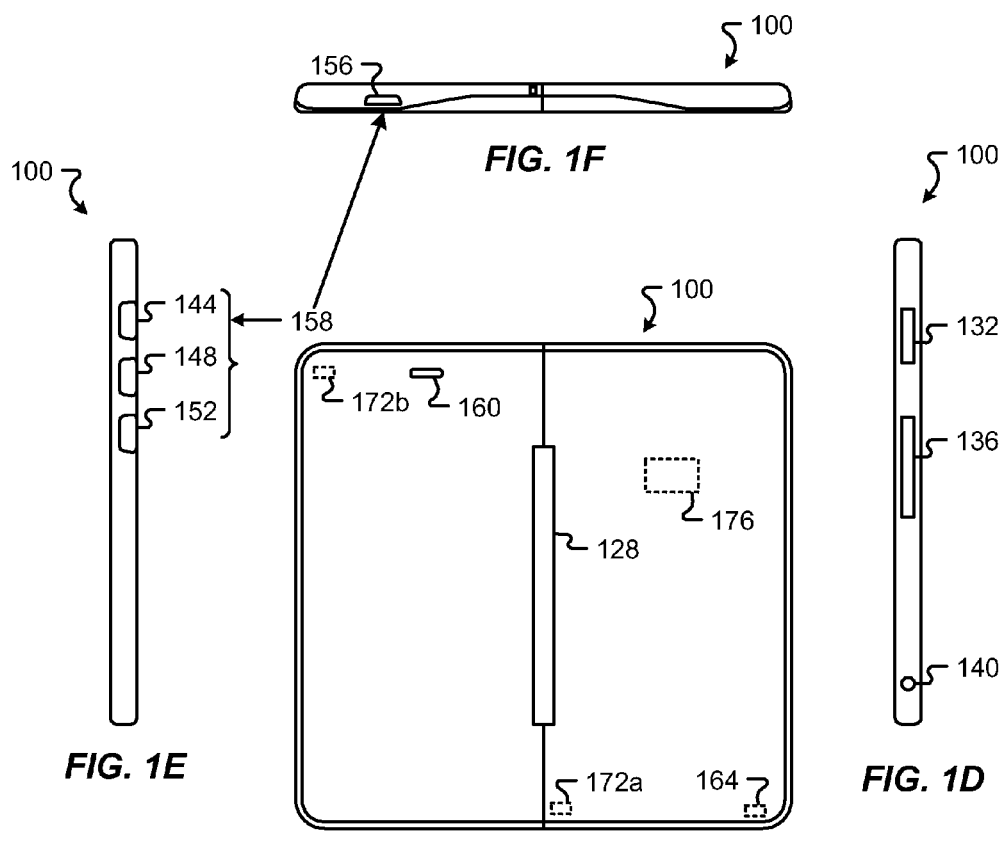

| | | PORTRAIT | | | | | LANDSCAPE | | | | | |
|---|---|---|---|---|---|---|---|---|---|---|---|---|
| | | OPEN | CLOSED | EASEL | MODIFIED EASEL | PHONE | IMAGE/VIDEO | OPEN | CLOSED | EASEL | MODIFIED EASEL | PHONE | IMAGE/VIDEO |
| PORTRAIT | OPEN | X | HT | HT | HT | P | I | AT | HAT | HAT | HAT | P | I |
| | CLOSED | HT | X | HAT | HAT | P | I | HAT | AT | HAT | HAT | P | I |
| | EASEL | HT | HT | X | X | P | I | HAT | HAT | HAT | HAT | P | I |
| | MODIFIED EASEL | HT | X | HT | X | X | X | HAT | HAT | HAT | X | X | HAT |
| | PHONE | HT | HT | HT | HT | P | I | HAT | HAT | HAT | HAT | P | |
| | IMAGE/VIDEO | AT | HAT | HAT | HAT | P | I | X | HT | HAT | HAT | P | I |
| LANDSCAPE | OPEN | HAT | AT | HAT | HAT | P | I | HT | X | HAT | HAT | P | I |
| | CLOSED | HAT | HAT | HAT | HAT | P | I | HT | HT | X | HAT | P | I |
| | EASEL | HAT | HAT | HAT | HAT | P | AT | HT | HT | HAT | HAT | P | I |
| | MODIFIED EASEL | HAT | HAT | HAT | HAT | HAT | | HT | HT | HT | X | P | X |
| | PHONE | | | | | | | | | | | | |
| | IMAGE/VIDEO | | | | | | | | | | | | |
| DOCKED | | | | | | | | DOCKING SIGNAL | | | | | |

*FIG. 3B*

Key:
H - Hall Effect Sensor(s)
a - accelerometer(s)
T - Timer
P – communications Trigger
I – Image / Video capture Request Tap Long Press Drag Flick Pinch Spread

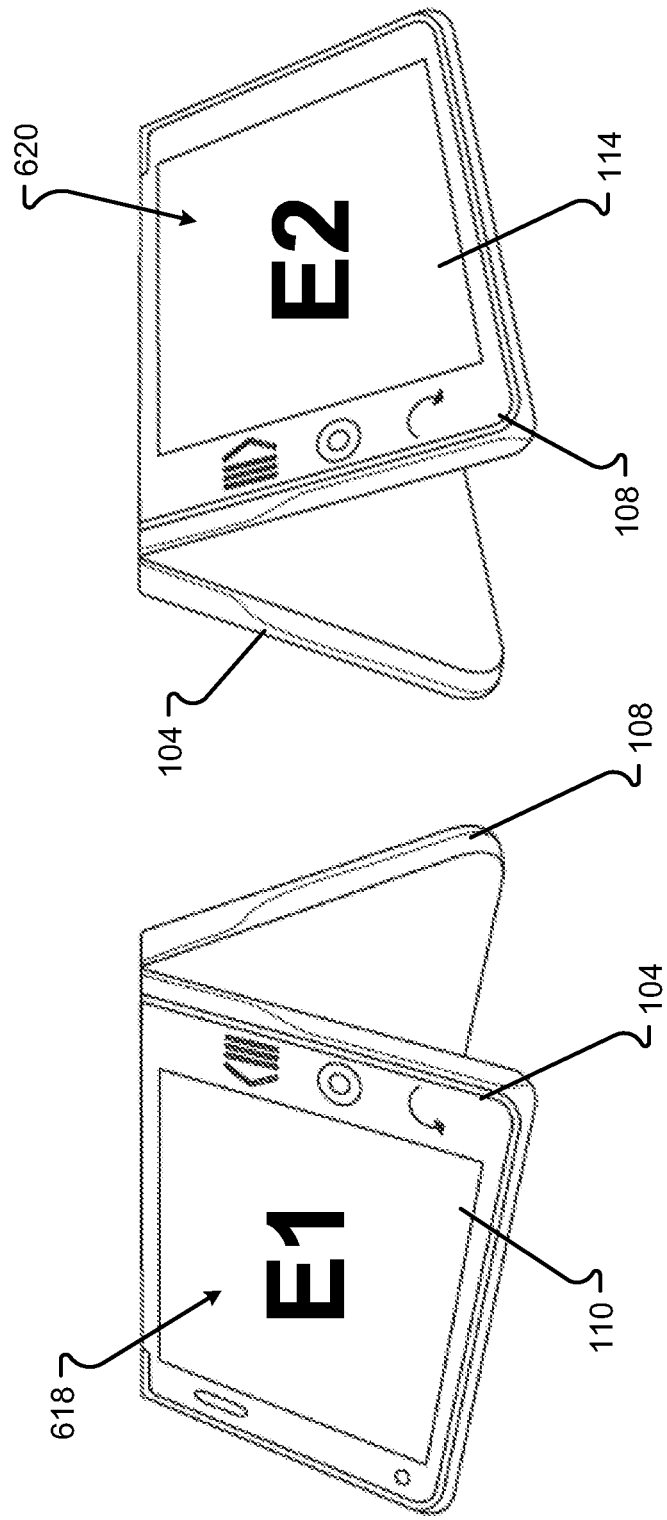

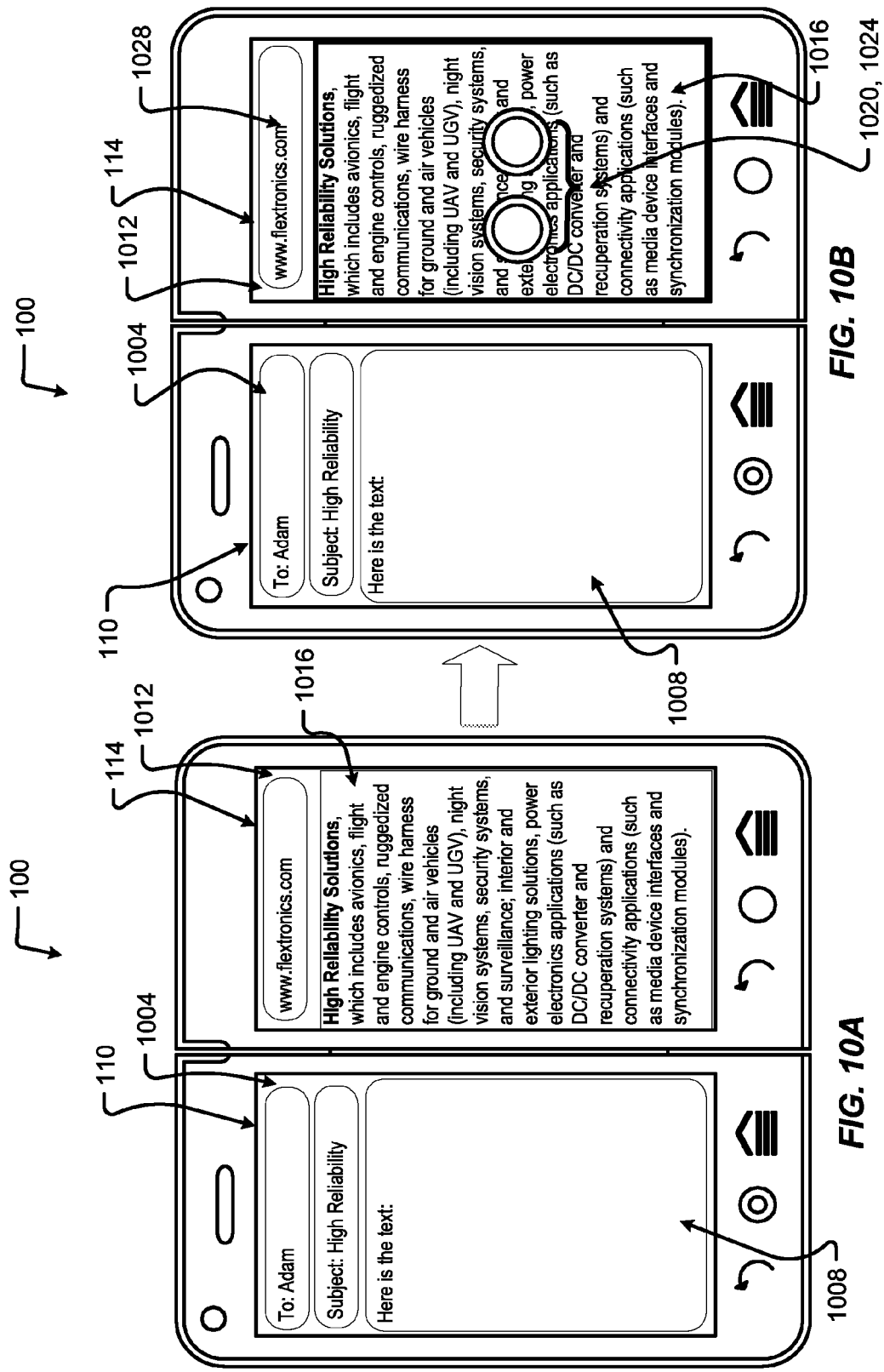

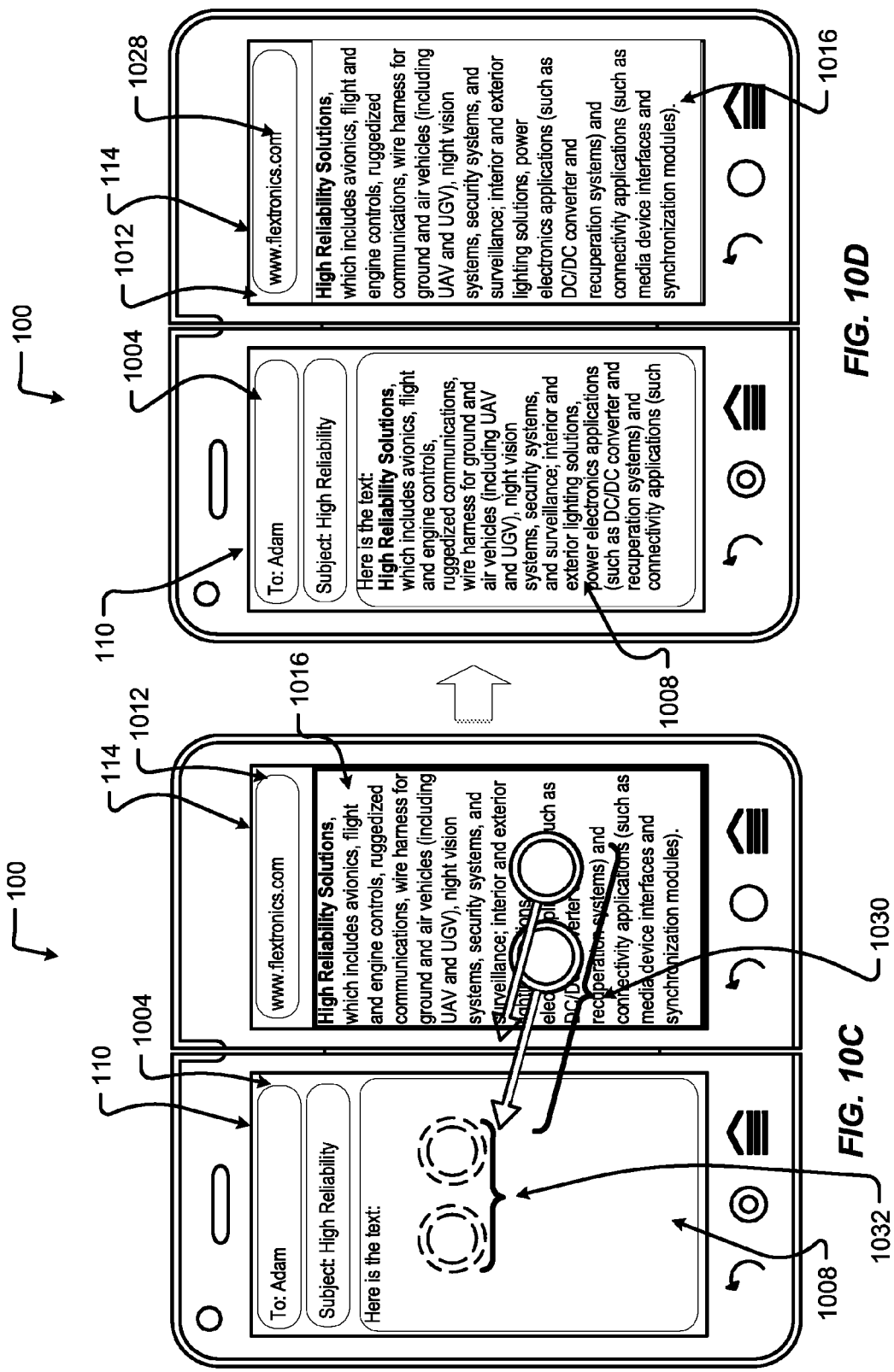

METHOD AND SYSTEM FOR PERFORMING DRAG AND DROP OPERATIONS ON A DEVICE VIA USER GESTURES

CROSS REFERENCE TO RELATED APPLICATION

The present application claims the benefits of and priority, under 35 U.S.C. §119(e), to U.S. Provisional Application Ser. Nos. 61/389,000, filed Oct. 1, 2010, entitled "DUAL DISPLAY WINDOWING SYSTEM;" 61/389,117, filed Oct. 1, 2010, entitled "MULTI-OPERATING SYSTEM PORTABLE DOCKING DEVICE;" 61/389,087, filed Oct. 1, 2010, entitled "TABLET COMPUTING USER INTERFACE;" 61/458,150, filed Nov. 17, 2010, entitled "Dual Screen Email Client;" 61/539,884, filed Sep. 27, 2011, entitled "MOBILE DEVICE." Each of the aforementioned documents is incorporated herein by this reference in their entirety for all that they teach and for all purposes.

BACKGROUND

A substantial number of handheld computing devices, such as cellular phones, tablets, and E-Readers, make use of a touch screen display not only to deliver display information to the user but also to receive inputs from user interface commands. While touch screen displays may increase the configurability of the handheld device and provide a wide variety of user interface options, this flexibility typically comes at a price. The dual use of the touch screen to provide content and receive user commands, while flexible for the user, may obfuscate the display and cause visual clutter, thereby leading to user frustration and loss of productivity.

The small form factor of handheld computing devices requires a careful balancing between the displayed graphics and the area provided for receiving inputs. On the one hand, the small display constrains the display space, which may increase the difficulty of interpreting actions or results. On the other, a virtual keypad or other user interface scheme is superimposed on or positioned adjacent to an executing application, requiring the application to be squeezed into an even smaller portion of the display.

This balancing act is particularly difficult for single display touch screen devices. Single display touch screen devices are crippled by their limited screen space. When users are entering information into the device, through the single display, the ability to interpret information in the display can be severely hampered, particularly when a complex interaction between display and interface is required.

DESCRIPTION OF TERMS

The present section describes and/or defines terms used herein. Such terms are bolded and italicized in their respective descriptions/definitions in this "DESCRIPTION OF TERMS" section.

(1.1) The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

(1.2) The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

(1.3) The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

(1.4) The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

(1.5) The term "application" as used herein refers to (i) a software program installed on a device such as multi-screen device, and/or (ii) the display therefor on an electronic display screen, wherein the application is computer software designed to help the user to perform one or more predetermined tasks. Examples include enterprise software, accounting software, office suites, graphics software, and media players. An "application" has a user interface for receiving and presenting information from a user. An "application" as used herein typically refers to software (and/or its graphical presentation) wherein: (i) the application can be activated from a user input that explicitly identifies the application separately and independently from other applications; (ii) the application is interactive with the user for assisting the user in performing a task that the user is cognizant of and purposefully activates the application to perform the task, and (iii) the application is not viewed by the user as providing graphical interactions for graphically displaying other applications that are operable independently from the application for, e.g., one or more of being independently being installed, uninstalled, downloaded, displayed, not displayed, minimized or maximized, or of independently processing user input and displaying results therefrom.

(1.6) The term "application window" refers to a potentially complex data structure(s) defining a graphical presentation of interrelated information that can be manipulated on a graphical display screen for moving, minimizing, and maximizing as a unit. Each application window has an "application" associated therewith that defines predetermined user input thereto to which the application window is responsive according to processing performed by the associated application. As referred to herein, an "application window" also refers its graphical presentation when the application window is displayed on an electronic display device such as a "touch screen" as one skilled in the art will appreciate.

(1.7) The term "desktop" refers to a metaphor used to portray systems. A desktop is generally considered a "surface" that typically includes pictures, called icons, widgets, folders, etc. that can activate or show applications, windows, cabinets, files, folders, documents, and other graphical items thereon. The icons are generally selectable to initiate a task through user interface interaction to allow a user to execute applications or conduct other operations. More precisely, as used herein a "desktop" refers to a potentially complex data structure for providing graphical interactions for graphically displaying with a display of the desktop a plurality of applications such that by user input to the desktop, the displays of the applications can be rearranged relative to the desktop display, added to the desktop display, deleted from the desktop display, and activated from the desktop display. Each desktop includes or has associated therewith data identifying it as a desktop and not an application and not an application window. Similarly, each application and application window includes or has associated therewith data identifying it has an application or application window and not a desktop.

(1.8) The term "display" refers to a portion of a screen used to display the output of a computer to a user.

(1.9) The term "displayed image" refers to an image produced on the display. A typical displayed image is a window or desktop. The displayed image may occupy all or a portion of the display.

(1.10) The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

(1.11) The term "gesture" or "user gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device (e.g., a user's finger across a touch sensitive surface of a device), movement of an implement or tool in relation to the device, audio inputs, etc. A gesture may be made on a device (such as on the screen) or with the device to interact with the device.

(1.12) The term "module" as used herein refers to any known or later developed hardware, software, firmware, artificial intelligence, fuzzy logic, or combination of hardware and software that is capable of performing the functionality associated with that element.

(1.13) The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

(1.14) A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

(1.15) A "single-screen application" refers to an application that is capable of producing one or more windows that may occupy only a single screen at a time.

(1.16) The term "screen," "touch screen," "touchscreen" and "display" refer to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

(1.17) The term "window" refers to a, typically rectangular, displayed image on at least part of a screen display that contains or provides content different from the rest of the screen. Such a window may obscure a desktop for the screen display.

(1.18) The terms "determine", "calculate" and "compute," and variations thereof, as used herein, are used interchangeably and include any type of methodology, process, mathematical operation or technique.

(1.19) It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

SUMMARY

There is a need for a multi-display handheld computing device that provides for enhanced power and/or versatility compared to conventional single display handheld computing devices. In particular, using the terms described hereinabove, the present disclosure is directed to copying data from one application display location, or screen, to a display location of another such application; e.g., a drag and drop operation as this term is used in the art. More particularly, the present disclosure is directed to performing such a drag and drop operation using gestures detected on the surface of one or more touch sensitive screen displays.

In one embodiment, the method of the drag and drop operation disclosed herein includes detecting that a user is using his/her finger(s) (or other means, e.g., a stylus) to perform a gesture such as a "press and hold" gesture, wherein the user presses and holds (e.g., for at least two seconds) at a desired location on a touch sensitive screen display for identifying underneath the "press and hold" location, the information that the user desires to copy. Upon detecting this "press and hold" user gesture and the display location therefor, the device determines a displayed informational content associated with the location (more particularly, associated with an application window display area/frame referred to herein as a "source area") that is appropriate for copying. A clipboard utility may be provided by the device for copying the selected information from the source area. Subsequently, upon the user inputting additional user gestures to the touch sensitive display screen(s), e.g., by dragging his/her finger gesture configuration thereon, the user can designate to the device an application window (more particularly, an application window display area/frame therein, referred to herein as a "target area") in which the selected information is pasted therein.

For a multi-display handheld computing device, the drag and drop operation may be performed over multiple touch sensitive display screens, wherein the information from an identified source area is on a first screen display, and the user identified target area is on a second screen display. Moreover, in performing such an inter-screen drag and drop operation (via gestures), the configuration of the display screens' relative physical orientation to one another may be taken into account. In particular, since the multi-display device may allow the display screens to be folded relative to one another, or alternatively, unfolded such that each of the display screens face a same direction, such inter-screen drag and drop may occur only when the display screens are unfolded relative to one another.

In a further embodiment, the source area (and/or data therein) may be highlighted during its selection process in order to provide the user with appropriate visual feedback that the desired informational content has been selected for the drag and drop operation.

These and other needs are addressed by the various aspects, embodiments, and/or configurations of the present disclosure. Also, while the disclosure is presented in terms of exemplary embodiments, it should be appreciated that individual aspects of the disclosure can be separately claimed.

In one embodiment, the present disclosure describes a method for performing a drag and drop operation using user finger gesture input to a device having at least one display screen, comprising the steps (a) through (c) following:

(a) receiving a first finger gesture input to a touch sensitive display device, wherein the first finger gesture input is for identifying a source area from which displayed data is to be copied;

(b) receiving a finger drag gesture input for identifying a target area of the display into which data from the source data is to be copied, wherein the target area corresponds to a location on the display where the drag gesture is last detected before it ceases to be detected; and (c) copying the data from the source area to the target area.

In a related embodiment, the present disclosure describes the multi-display device as having the following elements (a) through (d):

(a) first and second display screens of the device, wherein the device includes a folding mechanism attached to each of the first and second display screens for providing the first and seconds display screens in a folded configuration wherein the first and second display screens face in opposite directions, and in an unfolded configuration wherein the first and second display screens face in a substantially same direction;

(b) a multi-display manager for determining that the first and second display screens are in an unfolded configuration;

(c) a gesture interpreter for interpreting each of a first finger gesture input to the first display screen, and a finger drag gesture input to each of the first and second display screens;

(d) a window manager for receiving: (i) first data from the gesture interpreter, the first data indicative of the first finger gesture input, wherein the first data is for identifying a source area, displayed on the first display screen, from which displayed data is to be copied, and (ii) second input from the gesture interpreter, the second data indicative of the finger drag gesture input, wherein the second data is for identifying a target area of the second display screen into which data from the source data is to be copied, wherein the target area corresponds to a location of the second display screen where the drag gesture is last detected by the gesture interpreter before the drag gesture ceases to be detected by the gesture interpreter;

wherein when the source area and the target area are respectively determined on the first and second display screens, data representative of a contents of the source area is copied into the target area.

The present disclosure can provide a number of advantages depending on the particular aspect, embodiment, and/or configuration. In particular, the above described drag and drop operation as provided via user gesture input on a multi-display device provide an more intuitive and enhanced user experience for a user interacting with an embodiment of the multi-display device. These and other advantages will be apparent from the disclosure.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 1C includes a third view of an embodiment of a multi-screen user device 100;

FIG. 1D includes a fourth view of an embodiment of a multi-screen user device 100;

FIG. 1E includes a fifth view of an embodiment of a multi-screen user device 100;

FIG. 1F includes a sixth view of an embodiment of a multi-screen user device 100;

FIG. 1G includes a seventh view of an embodiment of a multi-screen user device 100;

FIG. 3B is a table of an embodiment of the state model for the device 100 based on the device's orientation and/or configuration;

FIG. 6G is a seventh representation of an embodiment of a device configuration generated in response to the device state for a device 100;

FIG. 6H is a eighth representation of an embodiment of a device configuration generated in response to the device state for a device 100;

FIGS. 10A through 10D show an illustration of a drag and drop operation performed via finger gestures, wherein the drag and drop operation copies from an application 564 displayed on display 114, and the paste task is into the display of another application 564 displayed on the display 110;

Figure 1A:
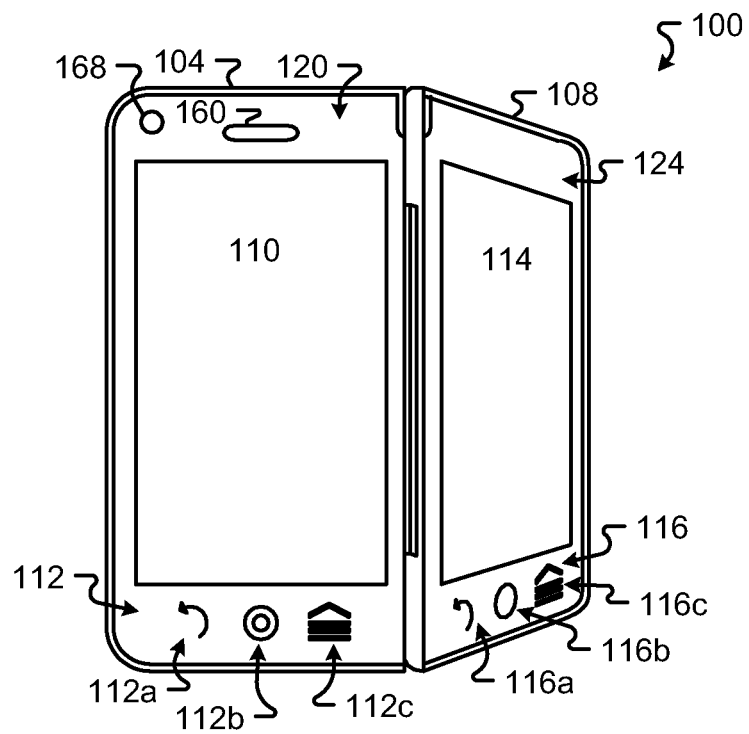
FIG. 1A includes a first view of an embodiment of a multi-screen user device 100.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a communications device, such as a cellular telephone, or other smart device. The device can include two screens that are oriented to provide several unique display configurations. Further, the device can receive user input in unique ways. The overall design and functionality of the device provides for an enhanced user experience making the device more useful and more efficient.

Mechanical Features:

FIGS. 1A-1J illustrate a device 100 in accordance with embodiments of the present disclosure. As described in greater detail below, device 100 can be positioned in a number of different ways each of which provides different functionality to a user. The device 100 is a multi-screen device that includes a primary screen 104 and a secondary screen 108, both of which are touch sensitive. In embodiments, the entire front surface of screens 104 and 108 may be touch sensitive and capable of receiving input by a user touching the front surface of the screens 104 and 108. Primary screen 104 includes touch sensitive display 110, which, in addition to being touch sensitive, also displays information to a user. Secondary screen 108 includes touch sensitive display 114, which also displays information to a user. In other embodiments, screens 104 and 108 may include more than one display area.

Primary screen 104 also includes a configurable area 112 that has been configured for specific inputs when the user touches portions of the configurable area 112. Secondary screen 108 also includes a configurable area 116 that has been configured for specific inputs. Areas 112a and 116a have been configured to receive a "back" input indicating that a user would like to view information previously displayed. Areas 112b and 116b have been configured to receive a "menu" input indicating that the user would like to view options from a menu. Areas 112c and 116c have been configured to receive a "home" input indicating that the user would like to view information associated with a "home" view. In other embodiments, areas 112a-c and 116a-c may be configured, in addition to the configurations described above, for other types of specific inputs including controlling features of device 100, some non-limiting examples including adjusting overall system power, adjusting the volume, adjusting the brightness, adjusting the vibration, selecting of displayed items (on either of screen 104 or 108), operating a camera, operating a microphone, and initiating/terminating of telephone calls. Also, in some embodiments, areas 112a-C and 116a-C may be configured for specific inputs depending upon the application running on device 100 and/or information displayed on touch sensitive displays 110 and/or 114.

In addition to touch sensing, primary screen 104 and secondary screen 108 may also include areas that receive input from a user without requiring the user to touch the display area of the screen. For example, primary screen 104 includes gesture capture area 120, and secondary screen 108 includes gesture capture area 124. These gesture capture areas are, e.g., capacitive touch sensitive areas which are able to receive user touch input to be used for recognizing gestures made by a user without the need for the user to actually touch the surface of the display area (i.e., display area 110 or 114). In comparison to touch sensitive displays 110 and 114, the gesture capture areas 120 and 124 are commonly not capable of rendering a displayed image, and in particular, cannot display a desktop or an application window.

Figure 1B:
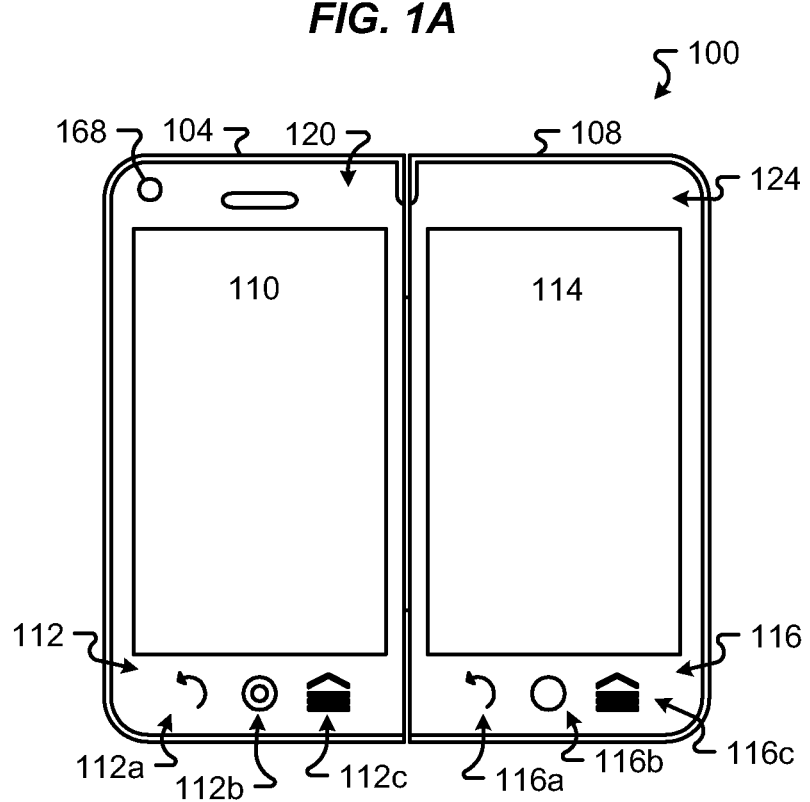
FIG. 1B includes a second view of an embodiment of a multi-screen user device 100.

The two screens 104 and 108 are connected together with a hinge 128, shown clearly in FIG. 1C (illustrating a back view of device 100). Hinge 128, in the embodiment shown in FIGS. 1A-1J, is a center hinge that connects screens 104 and 108 so that when the hinge is closed, screens 104 and 108 are juxtaposed (i.e., side-by-side) as shown in FIG. 1B (illustrating a front view of device 100). Hinge 128 can be opened to position the two screens 104 and 108 in different relative positions to each other. As described in greater detail below, the device 100 may have different functionalities depending on the relative positions of screens 104 and 108.

FIG. 1D illustrates the right side of device 100. As shown in FIG. 1D, secondary screen 108 also includes a card slot 132 and a port 136 on its side. Card slot 132 in embodiments, accommodates different types of cards including a subscriber identity module (SIM). Port 136 in embodiments is an input/output port (I/O port) that allows device 100 to be connected to other peripheral devices, such as a display, keyboard, or printing device. As can be appreciated, these are merely some examples and in other embodiments device 100 may include other slots and ports such as slots and ports for accommodating additional memory devices and/or for connecting other peripheral devices. Also shown in FIG. 1D is an audio jack 140 that accommodates a tip, ring, sleeve (TRS) connector for example to allow a user to utilize headphones or a headset.

Device 100 also includes a number of buttons 158. For example, FIG. 1E illustrates the left side of device 100. As shown in FIG. 1E, the side of primary screen 104 includes three buttons 144, 148, and 152, which can be configured for specific inputs. For example, buttons 144, 148, and 152 may be configured to, in combination or alone, control a number of aspects of device 100. Some non-limiting examples include overall system power, volume, brightness, vibration, selection of displayed items (on either of screen 104 or 108), a camera, a microphone, and initiation/termination of telephone calls. In some embodiments, instead of separate buttons two buttons may be combined into a rocker button. This arrangement is useful in situations where the buttons are configured to control features such as volume or brightness. In addition to buttons 144, 148, and 152, device 100 also includes a button 156, shown in FIG. 1F, which illustrates the top of device 100. In one embodiment, button 156 is configured as an on/off button used to control overall system power to device 100. In other embodiments, button 156 is configured to, in addition to or in lieu of controlling system power, control other aspects of device 100. In some embodiments, one or more of the buttons 144, 148, 152, and 156 are capable of supporting different user commands. By way of example, a normal press has a duration commonly of less than about 1 second and resembles a quick tap. A medium press has a duration commonly of 1 second or more but less than about 12 seconds. A long press has a duration commonly of about 12 seconds or more. The function of the buttons is normally specific to the application that is currently in focus on the respective display 110 and 114. In a telephone application for instance and depending on the particular button, a normal, medium, or long press can mean end call, increase in call volume, decrease in call volume, and toggle microphone mute. In a camera or video application for instance and depending on the particular button, a normal, medium, or long press can mean increase zoom, decrease zoom, and take photograph or record video.

There are also a number of hardware components within device 100. As illustrated in FIG. 1C, device 100 includes a speaker 160 and a microphone 164. Device 100 also includes a camera 168 (FIG. 1B). Additionally, device 100 includes two position sensors 172A and 172B, which are used to determine the relative positions of screens 104 and 108. In one embodiment, position sensors 172A and 172B are Hall effect sensors. However, in other embodiments other sensors can be used in addition to or in lieu of the Hall effect sensors. An accelerometer 176 may also be included as part of device 100 to determine the orientation of the device 100 and/or the orientation of screens 104 and 108. Additional internal hardware components that may be included in device 100 are described below with respect to FIG. 2.

The overall design of device 100 allows it to provide additional functionality not available in other communication devices. Some of the functionality is based on the various positions and orientations that device 100 can have. As shown in FIGS. 1B-1G, device 100 can be operated in an "open" position where screens 104 and 108 are juxtaposed. This position allows a large display area for displaying information to a user. When position sensors 172A and 172B determine that device 100 is in the open position, they can generate a signal that can be used to trigger different events such as displaying information on both screens 104 and 108. Additional events may be triggered if accelerometer 176 determines that device 100 is in a portrait position (FIG. 1B) as opposed to a landscape position (not shown).

Figure 1H:
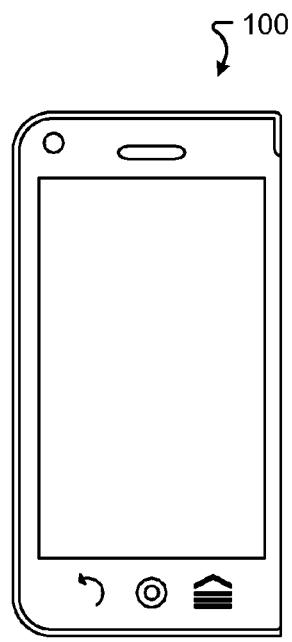
FIG. 1H includes a eighth view of an embodiment of a multi-screen user device 100.

In addition to the open position, device 100 may also have a "closed" position illustrated in FIG. 1H. Again, position sensors 172A and 172B can generate a signal indicating that device 100 is in the "closed" position. This can trigger an event that results in a change of displayed information on screen 104 and/or 108. For example, device 100 may be programmed to stop displaying information on one of the screens, e.g., screen 108, since a user can only view one screen at a time when device 100 is in the "closed" position. In other embodiments, the signal generated by position sensors 172A and 172B, indicating that the device 100 is in the "closed" position, can trigger device 100 to answer an incoming telephone call. The "closed" position can also be a preferred position for utilizing the device 100 as a mobile phone.

Figure 1I:
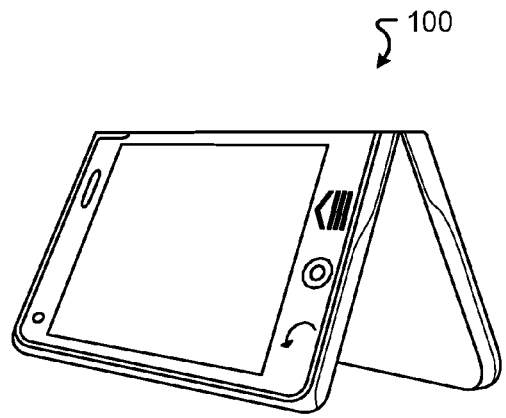
FIG. 1I includes a ninth view of an embodiment of a multi-screen user device 100.

Device 100 can also be used in an "easel" position which is illustrated in FIG. 1I. In the "easel" position, screens 104 and 108 are angled with respect to each other and facing outward with the edges of screens 104 and 108 substantially horizontal. In this position, device 100 can be configured to display information on both screens 104 and 108 to allow two users to simultaneously interact with device 100. When device 100 is in the "easel" position, sensors 172A and 172B generate a signal indicating that the screens 104 and 108 are positioned at an angle to each other, and the accelerometer 176 can generate a signal indicating that device 100 has been placed so that the edge of screens 104 and 108 are substantially horizontal. The signals can then be used in combination to generate events that trigger changes in the display of information on screens 104 and 108.

Figure 1J:
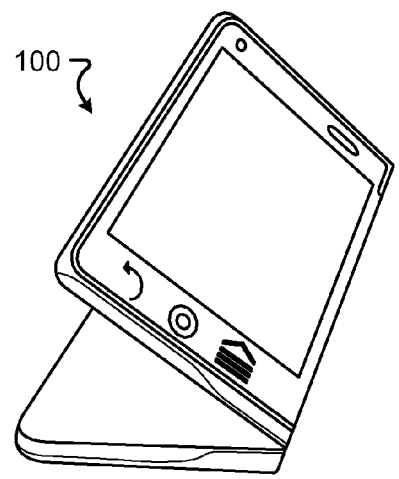
FIG. 1J includes a tenth view of an embodiment of a multi-screen user device 100.

FIG. 1J illustrates device 100 in a "modified easel" position. In the "modified easel" position, one of screens 104 or 108 is used as a stand and is faced down on the surface of an object such as a table. This position provides a convenient way for information to be displayed to a user in landscape orientation. Similar to the easel position, when device 100 is in the "modified easel" position, position sensors 172A and 172B generate a signal indicating that the screens 104 and 108 are positioned at an angle to each other. The accelerometer 176 would generate a signal indicating that device 100 has been positioned so that one of screens 104 and 108 is faced downwardly and is substantially horizontal. The signals can then be used to generate events that trigger changes in the display of information of screens 104 and 108. For example, information may not be displayed on the screen that is face down since a user cannot see the screen.

Transitional states are also possible. When the position sensors 172A and B and/or accelerometer indicate that the screens are being closed or folded (from open), a closing transitional state is recognized. Conversely when the position sensors 172A and B indicate that the screens are being opened or folded (from closed), an opening transitional state is recognized. The closing and opening transitional states are typically time-based, or have a maximum time duration from a sensed starting point. Normally, no user input is possible when one of the closing and opening states is in effect. In this manner, incidental user contact with a screen during the closing or opening function is not misinterpreted as user input. In embodiments, another transitional state is possible when the device 100 is closed. This additional transitional state allows the display to switch from one screen 104 to the second screen 108 when the device 100 is closed based on some user input, e.g., a double tap on the screen 110,114.

As can be appreciated, the description of device 100 is made for illustrative purposes only, and the embodiments are not limited to the specific mechanical features shown in FIGS. 1A-1J and described above. In other embodiments, device 100 may include additional features, including one or more additional buttons, slots, display areas, hinges, and/or locking mechanisms. Additionally, in embodiments, the features described above may be located in different parts of device 100 and still provide similar functionality. Therefore, FIGS. 1A-1J and the description provided above are non-limiting.

Figure 2:
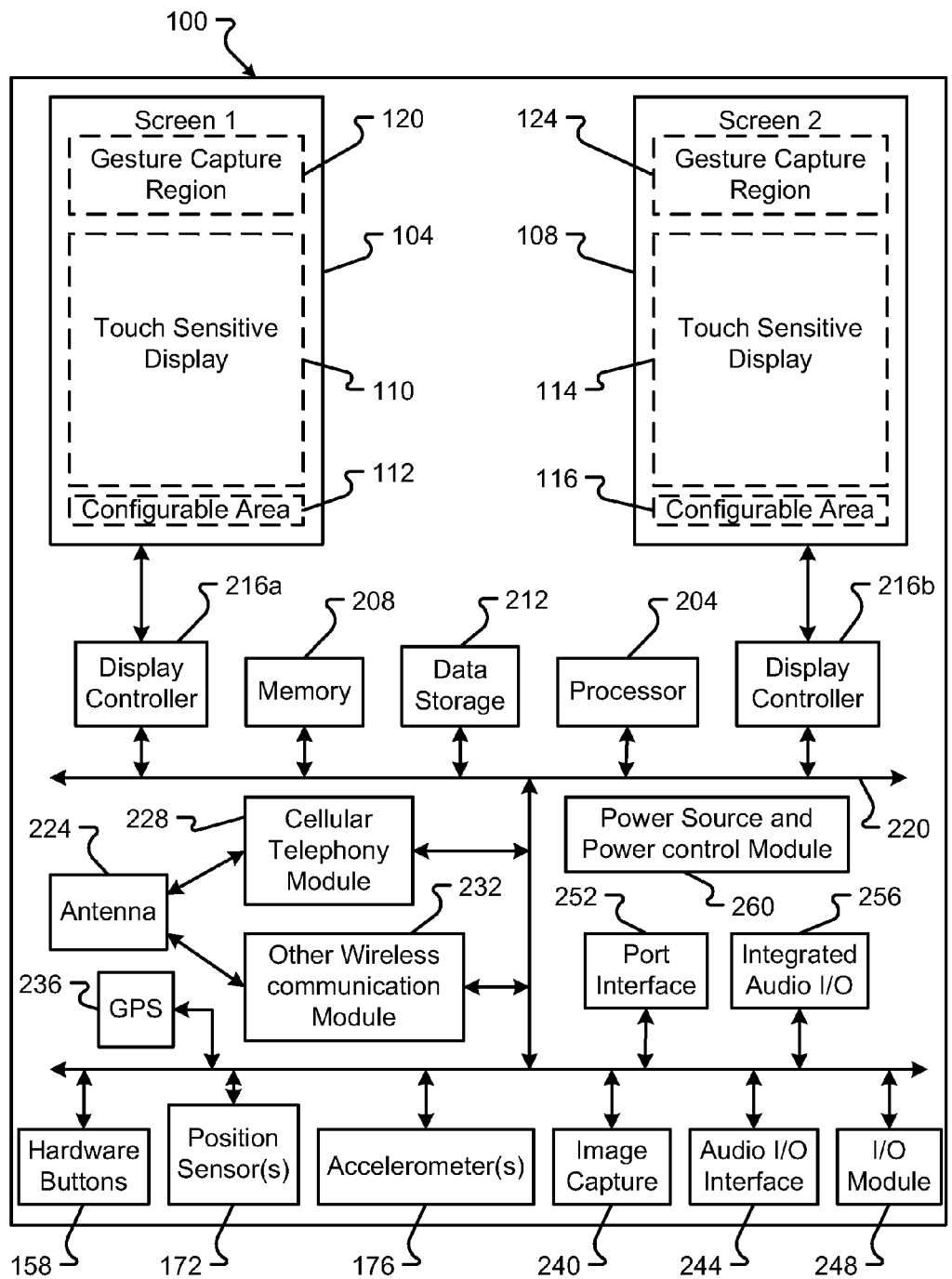
FIG. 2 is a block diagram of an embodiment of the hardware of the device 100.

Hardware Features:

FIG. 2 illustrates components of a device 100 in accordance with embodiments of the present disclosure. In general, the device 100 includes a primary screen 104 and a secondary screen 108. While the primary screen 104 and its components are normally enabled in both the opened and closed positions or states, the secondary screen 108 and its components are normally enabled in the opened state but disabled in the closed state. However, even when in the closed state a user or application triggered interrupt (such as in response to a phone application or camera application operation) can flip the active screen, or disable the primary screen 104 and enable the secondary screen 108, by a suitable command. Each screen 104, 108 can be touch sensitive and can include different operative areas. For example, a first operative area, within each touch sensitive screen 104 and 108, may comprise a touch sensitive display 110, 114. In general, the touch sensitive display 110, 114 may comprise a full color, touch sensitive display. A second area within each touch sensitive screen 104 and 108 may comprise a gesture capture region 120, 124. The gesture capture region 120, 124 may comprise an area or region that is outside of the touch sensitive display 110, 114 area, and that is capable of receiving input, for example in the form of gestures provided by a user. However, the gesture capture region 120, 124 does not include pixels that can perform a display function or capability.

A third region of the touch sensitive screens 104 and 108 may comprise a configurable area 112, 116. The configurable area 112, 116 is capable of receiving input and has display or limited display capabilities. In embodiments, the configurable area 112, 116 may present different input options to the user. For example, the configurable area 112, 116 may display buttons or other relatable items. Moreover, the identity of displayed buttons, or whether any buttons are displayed at all within the configurable area 112, 116 of a touch sensitive screen 104 or 108, may be determined from the context in which the device 100 is used and/or operated. In an exemplary embodiment, the touch sensitive screens 104 and 108 comprise liquid crystal display devices extending across at least those regions of the touch sensitive screens 104 and 108 that are capable of providing visual output to a user, and a capacitive input matrix over those regions of the touch sensitive screens 104 and 108 that are capable of receiving input from the user.

One or more display controllers 216a, 216b may be provided for controlling the operation of the touch sensitive screens 104 and 108, including input (touch sensing) and output (display) functions. In the exemplary embodiment illustrated in FIG. 2, a separate touch screen controller 216a or 216b is provided for each touch screen 104 and 108. In accordance with alternate embodiments, a common or shared touch screen controller 216 may be used to control each of the included touch sensitive screens 104 and 108. In accordance with still other embodiments, the functions of a touch screen controller 216 may be incorporated into other components, such as a processor 204.

The processor 204 may comprise a general purpose programmable processor or controller for executing application programming or instructions. In accordance with at least some embodiments, the processor 204 may include multiple processor cores, and/or implement multiple virtual processors. In accordance with still other embodiments, the processor 204 may include multiple physical processors. As a particular example, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. The processor 204 generally functions to run programming code or instructions implementing various functions of the device 100.

A communication device 100 may also include memory 208 for use in connection with the execution of application programming or instructions by the processor 204, and for the temporary or long term storage of program instructions and/or data. As examples, the memory 208 may comprise RAM, DRAM, SDRAM, or other solid state memory. Alternatively or in addition, data storage 212 may be provided. Like the memory 208, the data storage 212 may comprise a solid state memory device or devices. Alternatively or in addition, the data storage 212 may comprise a hard disk drive or other random access memory.

In support of communications functions or capabilities, the device 100 can include a cellular telephony module 228. As examples, the cellular telephony module 228 can comprise a GSM, CDMA, FDMA and/or analog cellular telephony transceiver capable of supporting voice, multimedia and/or data transfers over a cellular network. Alternatively or in addition, the device 100 can include an additional or other wireless communications module 232. As examples, the other wireless communications module 232 can comprise a Wi-Fi, BLUETOOTH™, WiMax, infrared, or other wireless communications link. The cellular telephony module 228 and the other wireless communications module 232 can each be associated with a shared or a dedicated antenna 224.

A port interface 252 may be included. The port interface 252 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 252 can support the supply of power to or from the device 100. The port interface 252 also comprises an intelligent element that comprises a docking module for controlling communications or other interactions between the device 100 and a connected device or component.

An input/output module 248 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 244 can be included to provide analog audio to an interconnected speaker or other device, and to receive analog audio input from a connected microphone or other device. As an example, the audio input/output interface/device(s) 244 may comprise an associated amplifier and analog to digital converter. Alternatively or in addition, the device 100 can include an integrated audio input/output device 256 and/or an audio jack for interconnecting an external speaker or microphone. For example, an integrated speaker and an integrated microphone can be provided, to support near talk or speaker phone operations.

Hardware buttons 158 can be included for example for use in connection with certain control operations. Examples include a master power switch, volume control, etc., as described in conjunction with FIGS. 1A through 1J. One or more image capture interfaces/devices 240, such as a camera, can be included for capturing still and/or video images. Alternatively or in addition, an image capture interface/device 240 can include a scanner or code reader. An image capture interface/device 240 can include or be associated with additional elements, such as a flash or other light source.

The device 100 can also include a global positioning system (GPS) receiver 236. In accordance with embodiments of the present invention, the GPS receiver 236 may further comprise a GPS module that is capable of providing absolute location information to other components of the device 100. An accelerometer(s) 176 may also be included. For example, in connection with the display of information to a user and/or other functions, a signal from the accelerometer 176 can be used to determine an orientation and/or format in which to display that information to the user.

Embodiments of the present invention can also include one or more position sensor(s) 172. The position sensor 172 can provide a signal indicating the position of the touch sensitive screens 104 and 108 relative to one another. This information can be provided as an input, for example to a user interface application, to determine an operating mode, characteristics of the touch sensitive displays 110, 114, and/or other device 100 operations. As examples, a screen position sensor 172 can comprise a series of Hall effect sensors, a multiple position switch, an optical switch, a Wheatstonebridge, a potentiometer, or other arrangement capable of providing a signal indicating of multiple relative positions the touch screens are in.

Communications between various components of the device 100 can be carried by one or more buses 222. In addition, power can be supplied to the components of the device 100 from a power source and/or power control module 260. The power control module 260 can, for example, include a battery, an AC to DC converter, power control logic, and/or ports for interconnecting the device 100 to an external source of power.

Figure 3A:
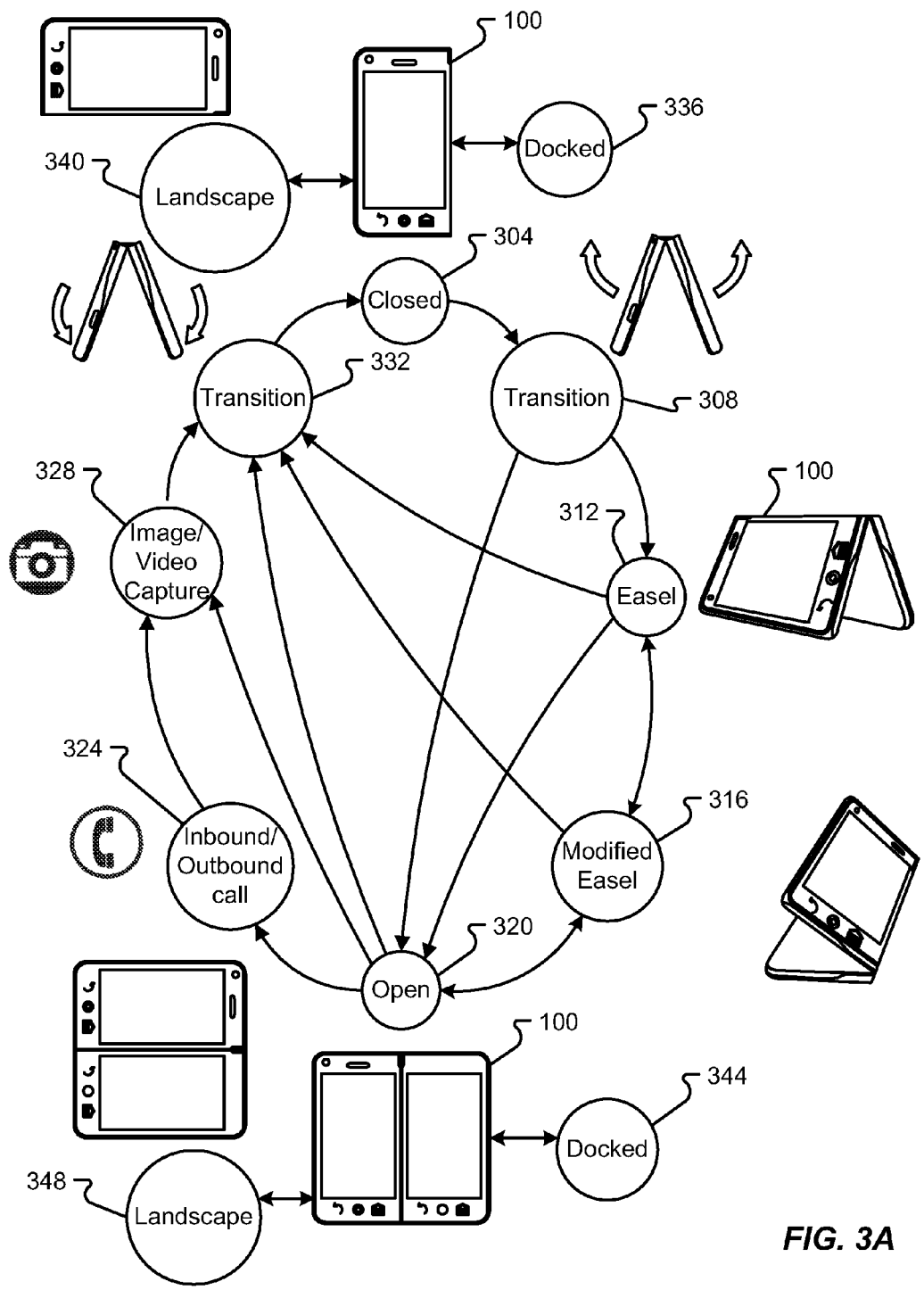
FIG. 3A is a block diagram of an embodiment of the state model for the device 100 based on the device's orientation and/or configuration.

Device State:

FIGS. 3A and 3B represent illustrative states of device 100. While a number of illustrative states are shown, and transitions from a first state to a second state, it is to be appreciated that the illustrative state diagram may not encompass all possible states and/or all possible transitions from a first state to a second state. As illustrated in FIG. 3, the various arrows between the states (illustrated by the state represented in the circle) represent a physical change that occurs to the device 100, that is detected by one or more of hardware and software, the detection triggering one or more of a hardware and/or software interrupt that is used to control and/or manage one or more functions of device 100.

As illustrated in FIG. 3A, there are twelve exemplary "physical" states: closed 304, transition 308 (or opening transitional state), easel 312, modified easel 316, open 320, inbound/outbound call or communication 324, image/video capture 328, transition 332 (or closing transitional state), landscape 340, docked 336, docked 344 and landscape 348. Next to each illustrative state is a representation of the physical state of the device 100 with the exception of states 324 and 328, where the state is generally symbolized by the international icon for a telephone and the icon for a camera, respectfully.

In state 304, the device is in a closed state with the device 100 generally oriented in the portrait direction with the primary screen 104 and the secondary screen 108 back-to-back in different planes (see FIG. 1H). From the closed state, the device 100 can enter, for example, docked state 336, where the device 100 is coupled with a docking station, docking cable, or in general docked or associated with one or more other devices or peripherals, or the landscape state 340, where the device 100 is generally oriented with the primary screen 104 facing the user, and the primary screen 104 and the secondary screen 108 being back-to-back.

In the closed state, the device can also move to a transitional state where the device remains closed but the display (of an application or desktop) is moved from one screen 104 to another screen 108 based on a user input, e.g., a double tap on the screen 110, 114. Still another embodiment includes a bilateral state. In the bilateral state, the device remains closed, but a single application displays at least one window on both the first display 110 and the second display 114. The windows shown on the first and second display 110, 114 may be the same or different based on the application and the state of that application. For example, while acquiring an image with a camera, the device may display the view finder on the first display 110 and displays a preview for the photo subjects (full screen and mirrored left-to-right) on the second display 114.

In state 308, a transition state from the closed state 304 to the semi-open state or easel state 312, the device 100 is shown opening with the primary screen 104 and the secondary screen 108 being rotated around a point of axis coincidence with the hinge. Upon entering the easel state 312, the primary screen 104 and the secondary screen 108 are separated from one another such that, for example, the device 100 can sit in an easel-like configuration on a surface.

In state 316, known as the modified easel position, the device 100 has the primary screen 104 and the secondary screen 108 in a similar relative relationship to one another as in the easel state 312, with the difference being one of the primary screen 104 or the secondary screen 108 are placed on a surface as shown.

State 320 is the open state where the primary screen 104 and the secondary screen 108 are generally on the same plane. From the open state, the device 100 can transition to the docked state 344 or the open landscape state 348. In the open state 320, the primary screen 104 and the secondary screen 108 are generally in the portrait-like orientation while in landscaped state 348 the primary screen 104 and the secondary screen 108 are generally in a landscape-like orientation.

State 324 is illustrative of a communication state, such as when an inbound or outbound call is being received or placed, respectively, by the device 100. While not illustrated for clarity, it should be appreciated the device 100 can transition to the inbound/outbound call state 324 from any state illustrated in FIG. 3. In a similar manner, the image/video capture state 328 can be entered into from any other state in FIG. 3, with the image/video capture state 328 allowing the device 100 to take one or more images via a camera and/or videos with a video capture device 240.

Transition state 322 illustratively shows primary screen 104 and the secondary screen 108 being closed upon one another for entry into, for example, the closed state 304.

FIG. 3B illustrates, with reference to the key, the inputs that are received to detect a transition from a first state to a second state. In FIG. 3B, various combinations of states are shown with in general, a portion of the columns being directed toward a portrait state 352, a landscape state 356, and a portion of the rows being directed to portrait state 360 and landscape state 364.

In FIG. 3B, the Key indicates that "H" represents an input from one or more Hall Effect sensors, "A" represents an input from one or more accelerometers, "T" represents an input from a timer, "P" represents a communications trigger input and "I" represents an image and/or video capture request input. Thus, in the center portion 376 of the chart, an input, or combination of inputs, are shown that represent how the device 100 detects a transition from a first physical state to a second physical state.

As discussed, in the center portion of the chart 376, the inputs that are received enable the detection of a transition from, for example, a portrait open state to a landscape easel state—shown in bold—"HAT." For this exemplary transition from the portrait open to the landscape easel state, a Hall Effect sensor ("H"), an accelerometer ("A") and a timer ("T") input may be needed. The timer input can be derived from, for example, a clock associated with the processor.

In addition to the portrait and landscape states, a docked state 368 is also shown that is triggered based on the receipt of a docking signal 372. As discussed above and in relation to FIG. 3, the docking signal can be triggered by the association of the device 100 with one or more other device 100s, accessories, peripherals, smart docks, or the like.

User Interaction:

FIGS. 4A through 4H depict various graphical representations of gesture inputs that may be recognized by the screens 104, 108. The gestures may be performed not only by a user's body part, such as a digit, but also by other devices, such as a stylus, that may be sensed by the contact sensing portion(s) of a screen 104, 108. In general, gestures are interpreted differently, based on where the gestures are performed (either directly on the display 110, 114 or in the gesture capture region 120, 124). For example, in one embodiment, gestures in the display 110,114 may be directed to a desktop or application, and gestures in the gesture capture region 120, 124 may be interpreted as for the system.

With reference to FIGS. 4A-4H, a first type of gesture, a touch gesture 420, is substantially stationary on the screen 104,108 for a selected length of time. A circle 428 represents a touch or other contact type received at particular location of a contact sensing portion of the screen. The circle 428 may include a border 432, the thickness of which indicates a length of time that the contact is held substantially stationary at the contact location. For instance, a tap 420 (or short press) has a thinner border 432a than the border 432b for a long press 424 (or for a normal press). The long press 424 may involve a contact that remains substantially stationary on the screen for longer time period than that of a tap 420. As will be appreciated, differently defined gestures may be registered depending upon the length of time that the touch remains stationary prior to contact cessation or movement on the screen.

Figure 4A:
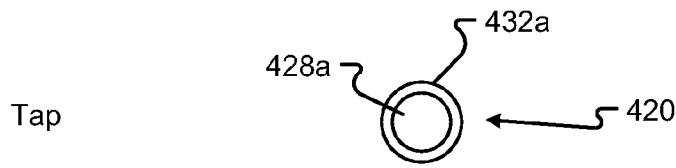
FIG. 4A is a first representation of an embodiment of user gesture received at a device 100.
Figure 4B:
FIG. 4B is a second representation of an embodiment of user gesture received at a device 100.
Figure 4C:
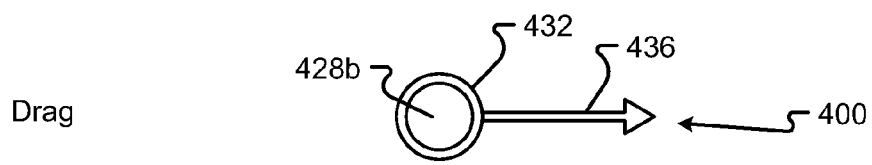
FIG. 4C is a third representation of an embodiment of user gesture received at a device 100.

With reference to FIG. 4C, a drag gesture 400 on the screen 104,108 is an initial contact (represented by circle 428) with contact movement 436 in a selected direction. The initial contact 428 may remain stationary on the screen 104,108 for a certain amount of time represented by the border 432. The drag gesture typically requires the user to contact an icon, window, or other displayed image at a first location followed by movement of the contact in a drag direction to a new second location desired for the selected displayed image. The contact movement need not be in a straight line but have any path of movement so long as the contact is substantially continuous from the first to the second locations.

Figure 4D:
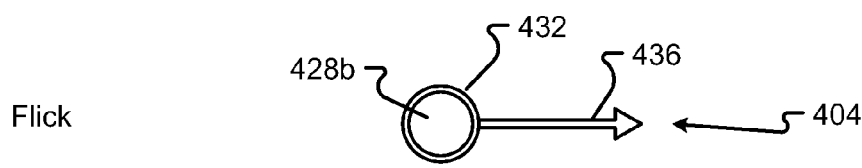
FIG. 4D is a fourth representation of an embodiment of user gesture received at a device 100.

With reference to FIG. 4D, a flick gesture 404 on the screen 104,108 is an initial contact (represented by circle 428) with truncated contact movement 436 (relative to a drag gesture) in a selected direction. In embodiments, a flick has a higher exit velocity for the last movement in the gesture compared to the drag gesture. The flick gesture can, for instance, be a finger snap following initial contact. Compared to a drag gesture, a flick gesture generally does not require continual contact with the screen 104,108 from the first location of a displayed image to a predetermined second location. The contacted displayed image is moved by the flick gesture in the direction of the flick gesture to the predetermined second location. Although both gestures commonly can move a displayed image from a first location to a second location, the temporal duration and distance of travel of the contact on the screen is generally less for a flick than for a drag gesture.

Figure 4E:
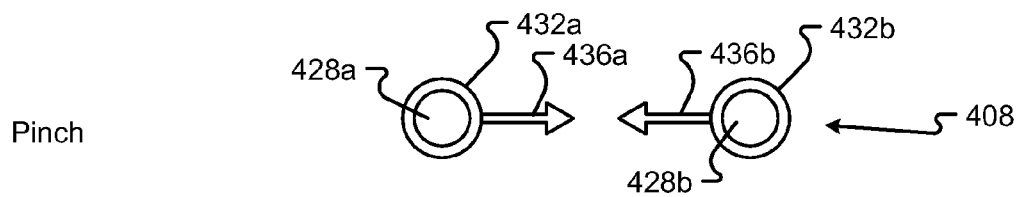
FIG. 4E is a fifth representation of an embodiment of user gesture received at a device 100.

With reference to FIG. 4E, a pinch gesture 408 on the screen 104,108 is depicted. The pinch gesture 408 may be initiated by a first contact 428 to the screen 104,108 by, for example, a first digit and a second contact 428*b* to the screen 104,108 by, for example, a second digit. The first and second contacts 428*a*,*b* may be detected by a common contact sensing portion of a common screen 104,108, by different contact sensing portions of a common screen 104 or 108, or by different contact sensing portions of different screens. The first contact 428*a* is held for a first amount of time, as represented by the border 432*a*, and the second contact 428*b* is held for a second amount of time, as represented by the border 432*b*. The first and second amounts of time are generally substantially the same, and the first and second contacts 428 *a, b* generally occur substantially simultaneously. The first and second contacts 428 *a, b* generally also include corresponding first and second contact movements 436 *a, b*, respectively. The first and second contact movements 436 *a, b* are generally in opposing directions. Stated another way, the first contact movement 436*a* is towards the second contact 436*b*, and the second contact movement 436*b* is towards the first contact 436*a*. More simply stated, the pinch gesture 408 may be accomplished by a user's digits touching the screen 104,108 in a pinching motion.

Figure 4F:
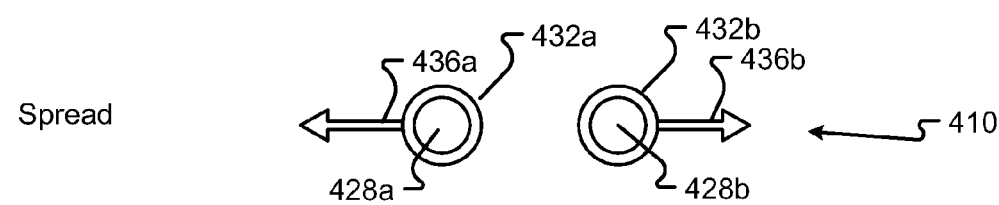
FIG. 4F is a sixth representation of an embodiment of user gesture received at a device 100.

With reference to FIG. 4F, a spread gesture 410 on the screen 104,108 is depicted. The spread gesture 410 may be initiated by a first contact 428*a* to the screen 104,108 by, for example, a first digit and a second contact 428*b* to the screen 104,108 by, for example, a second digit. The first and second contacts 428*a,b* may be detected by a common contact sensing portion of a common screen 104,108, by different contact sensing portions of a common screen 104,108, or by different contact sensing portions of different screens. The first contact 428*a* is held for a first amount of time, as represented by the border 432*a*, and the second contact 428*b* is held for a second amount of time, as represented by the border 432*b*. The first and second amounts of time are generally substantially the same, and the first and second contacts 428 *a, b* generally occur substantially simultaneously. The first and second contacts 428 *a, b* generally also include corresponding first and second contact movements 436*a, b*, respectively. The first and second contact movements 436 *a, b* are generally in a common direction. Stated another way, the first and second contact movements 436 *a, b* are away from the first and second contacts 428*a, b*. More simply stated, the spread gesture 410 may be accomplished by a user's digits touching the screen 104,108 in a spreading motion.

Figure 4G:
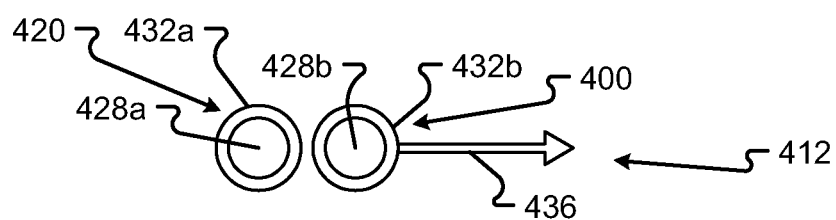
FIG. 4G is a seventh representation of an embodiment of user gesture received at a device 100.
Figure 4H:
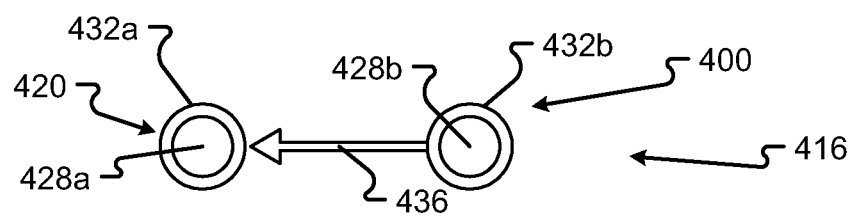
FIG. 4H is a eighth representation of an embodiment of user gesture received at a device 100.

The above gestures may be combined in any manner, such as those shown by FIGS. 4G and 4H, to produce a determined functional result. For example, in FIG. 4G a tap gesture 420 is combined with a drag or flick gesture 412 in a direction away from the tap gesture 420. In FIG. 4H, a tap gesture 420 is combined with a drag or flick gesture 412 in a direction towards the tap gesture 420.

The functional result of receiving a gesture can vary depending on a number of factors, including a state of the device 100, display 110, 114, or screen 104, 108, a context associated with the gesture, or sensed location of the gesture. The state of the device commonly refers to one or more of a configuration of the device 100, a display orientation, and user and other inputs received by the device 100. Context commonly refers to one or more of the particular application (s) selected by the gesture and the portion(s) of the application currently executing, whether the application is a single- or multi-screen application, and whether the application is a multi-screen application displaying one or more windows in one or more screens or in one or more stacks. Sensed location of the gesture commonly refers to whether the sensed set(s) of gesture location coordinates are on a touch sensitive display 110, 114 or a gesture capture region 120, 124, whether the sensed set(s) of gesture location coordinates are associated with a common or different display or screen 104,108, and/or what portion of the gesture capture region contains the sensed set(s) of gesture location coordinates.

A tap, when received by an a touch sensitive display 110, 114, can be used, for instance, to select an icon to initiate or terminate execution of a corresponding application, to maximize or minimize a window, to reorder windows in a stack, and to provide user input such as by keyboard display or other displayed image. A drag, when received by a touch sensitive display 110, 114, can be used, for instance, to relocate an icon or window to a desired location within a display, to reorder a stack on a display, or to span both displays (such that the selected window occupies a portion of each display simultaneously). A flick, when received by a touch sensitive display 110, 114 or a gesture capture region 120, 124, can be used to relocate a window from a first display to a second display or to span both displays (such that the selected window occupies a portion of each display simultaneously). Unlike the drag gesture, however, the flick gesture is generally not used to move the displayed image to a specific user-selected location but to a default location that is not configurable by the user.

The spread gesture, when received by a touch sensitive display 110, 114 or a gesture capture region 120, 124, can be used to minimize or otherwise increase the displayed area or size of a window (typically when received entirely by a common display), to switch windows displayed at the top of the stack on each display to the top of the stack of the other display (typically when received by different displays or screens), or to display an application manager (a "pop-up window" that displays the windows in the stack). The pinch gesture, when received by a touch sensitive display 110, 114 or a gesture capture region 120, 124, can be used to maximize or otherwise decrease the displayed area or size of a window, to switch windows displayed at the top of the stack on each display to the top of the stack of the other display (typically when received by different displays or screens), or to display an application manager (typically when received by an off-screen gesture capture region on the same or different screens).

The combined gestures of FIG. 4G, when received by a common display capture region in a common display or screen 104,108, can be used: (A) to hold constant a position or entry in a first window stack (a "window stack" being a first-in-last-accessible ordering or "stack" data structure of entries thereto, as one skilled in the art will understand, wherein each entry thereof provides data for displaying a corresponding application or desktop, and the ordering determines both the ordering of displaying the corresponding applications or desktops as well as their ordering for other operations such as deletion or insertion; further discussion of window stacks is provided hereinbelow; however, note that such a "window stack" may be only a logical arrangement of windows and/or desktops for one or both of the displays 110, 114) for the display 110 or 114 receiving the gesture, and (B) concurrently inserting into a second window stack, the window in the display that received the gesture. The combined gestures of FIG. 4H, when received by different display capture regions, in a common display or screen 104,108 (if such functionality is provided for a single display), or in different displays or screens, can be used to hold a first window stack location in a first window stack constant for a display receiving the tap part of the gesture while reordering a second window stack location in a second window stack to include a window in the display receiving the flick or drag gesture. Although specific gestures and gesture capture regions in the preceding examples have been associated with corresponding sets of functional results, it is to be appreciated that these associations can be redefined in any manner to produce differing associations between gestures and/or gesture capture regions and/or functional results.

Figure 5A:
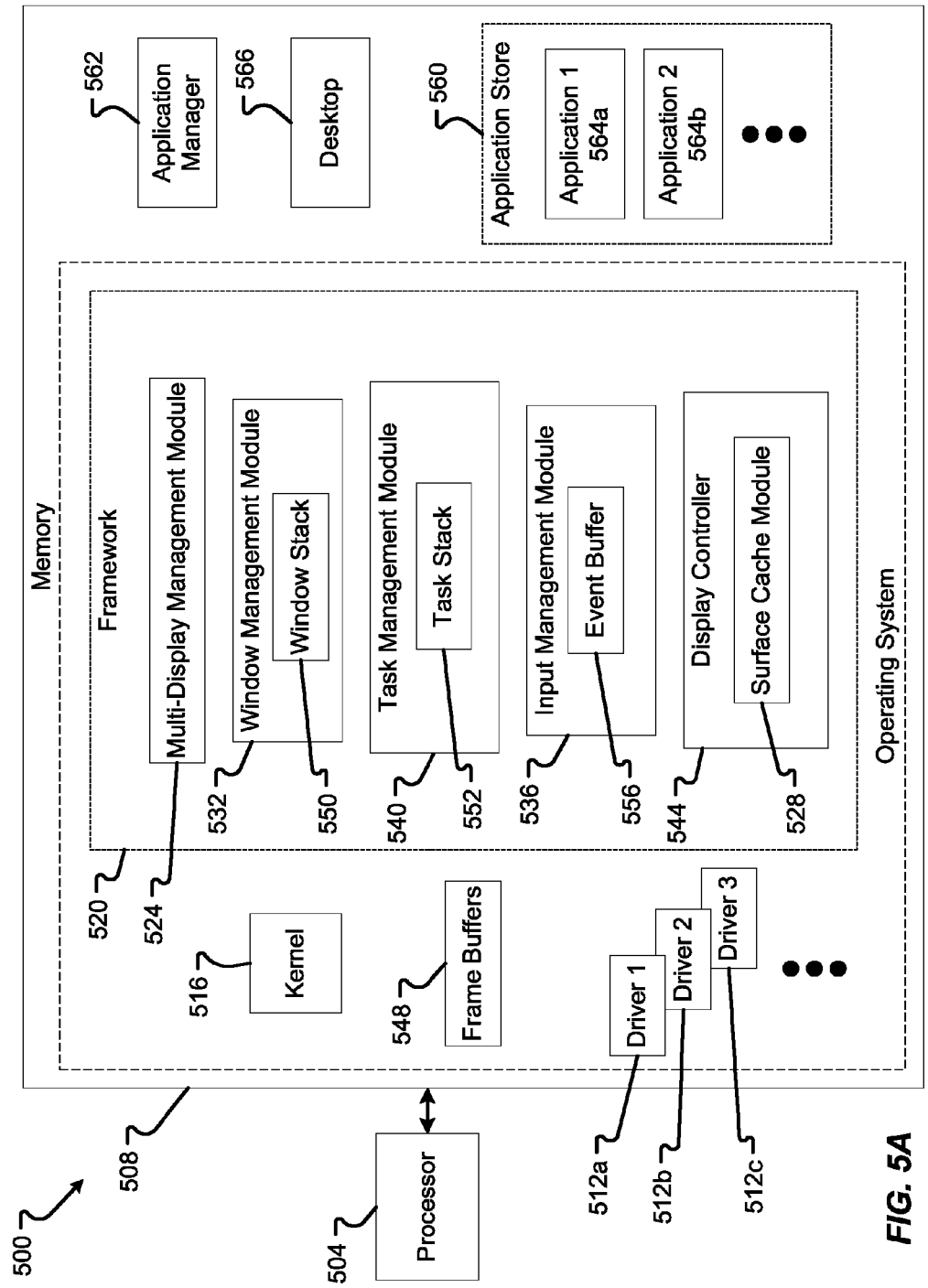
FIG. 5A is a block diagram of an embodiment of the software and/or firmware for a device 100.

Firmware and Software:

Referring to FIG. 5A, the memory 508 may store and the processor 504 may execute one or more software components. These components can include at least one operating system (OS) 516a and/or 516b, a framework 520, and/or one or more applications 564 (two such applications are shown in FIG. 5A, and are identified as 564a and 564b) from an application store 560. The processor 504 may receive inputs from drivers 512, previously described in conjunction with FIG. 2. The OS 516 can be any software, consisting of programs and data that manages computer hardware resources and provides common services for the execution of various applications 564. The OS 516 can be any operating system and, at least in some embodiments, dedicated to mobile devices, including, but not limited to, Linux, ANDROID™, iPhone OS (IOS™), WINDOWS PHONE 7™, etc. The OS 516 is operable to provide functionality to the phone by executing one or more operations, as described herein.

The applications 564 can be any higher level software that executes particular functionality for the user. Applications 564 can include programs such as email clients, web browsers, texting applications, games, media players, office suites, etc. The applications 564 can be stored in an application store 560, which may represent any memory or data storage, and the management software associated therewith, for storing the applications 564. Once executed, the applications 564 may be run in a different area of memory 508.

The framework 520 may be any software or data that allows the multiple tasks running on the device to interact. In embodiments, at least portions of the framework 520 and the discrete components described hereinafter may be considered part of the OS 516 or an application 564. However, these portions will be described as part of the framework 520, but those components are not so limited. The framework 520 can include, but is not limited to, a Multi-Display Management (MDM) module 524, a Surface Cache module 528, a Window Management module 532, an Input Management module 536, a Task Management module 540, a Display Controller, one or more frame buffers 548, a task stack 552, one or more window stacks 550 (which is a logical arrangement of windows and/or desktops in a display area), and/or an event buffer 556.

The MDM module 524 includes one or more modules that are operable to manage the display of applications 564 or other data on the screens of the device. An embodiment of the MDM module 524 is described in conjunction with FIG. 5B. In embodiments, the MDM module 524 receives inputs from the OS 516, the drivers 512 and the applications 564. The inputs assist the MDM module 524 in determining how to configure and allocate the displays according to the application's preferences and requirements, and the user's actions. Once a determination for display configurations is determined, the MDM module 524 can bind the applications 564 to a display configuration. The configuration may then be provided to one or more other components to generate the display.

The Surface Cache module 528 includes any memory or storage and the software associated therewith to store or cache one or more images from the display screens. Each display screen may have associated with the screen a series of active and non-active windows (or other display objects (such as a desktop display)). The active window (or other display object) is currently being displayed. The non-active windows (or other display objects) were opened and/or at some time displayed but are now "behind" the active window (or other display object). To enhance the user experience, before being covered by another active window (or other display object), a "screen shot" of a last generated image of the window (or other display object) can be stored. The Surface Cache module 528 may be operable to store the last active image of a window (or other display object) not currently displayed. Thus, the Surface Cache module 528 stores the images of non-active windows (or other display objects) in a data store (not shown).

In embodiments, the Window Management module 532 is operable to manage the windows (or other display objects) that are active or not active on each of the screens. The Window Management module 532, based on information from the MDM module 524, the OS 516, or other components, determines when a window (or other display object) is active or not active. The Window Management module 532 may then put a non-visible window (or other display object) in a "not active state" and, in conjunction with the Task Management module 540 suspend the application's operation. Further, the Window Management module 532 may assign a screen identifier to the window (or other display object) or manage one or more other items of data associated with the window (or other display object). The Window Management module 532 may also provide the stored information to the application 564, the Task Management module 540, or other components interacting with or associated with the window (or other display object).

The Input Management module 536 is operable to manage events that occur with the device. An event is any input into the window environment, for example, a user interface interactions with a user. The Input Management module 536 receives the events and logically stores the events in an event buffer 556. Events can include such user interface interactions as a "down event," which occurs when a screen 104, 108 receives a touch signal from a user, a "move event," which occurs when the screen 104, 108 determines that a user's finger is moving across a screen(s), an "up event, which occurs when the screen 104, 108 determines that the user has stopped touching the screen 104, 108, etc. These events are received, stored, and forwarded to other modules by the Input Management module 536.

A task can be an application component that provides a screen with which a user can interact in order to do something, such as dial the phone, take a photo, send an email, or view a map. Each task may be given a window in which to draw a user interface. The window typically fills the display 110,114, but may be smaller than the display 110,114 and float on top of other windows. An application 564 usually consists of multiple activities that are loosely bound to each other. Typically, one task in an application 564 is specified as the "main" task, which is presented to the user when launching the application for the first time. Each task can then start another task to perform different actions.

The Task Management module 540 is operable to manage the operation of the one or more applications 564 that may be executed by the device. Thus, the Task Management module 540 can receive signals to execute an application 564 stored in the application store 560. The Task Management module 540 may then instantiate one or more tasks or components of the application 564 to begin operation of the application 564. Further, the Task Management module 540 may suspend the application 564 based on user interface changes. Suspending the application 564 may maintain application data in memory but may limit or stop access to processor cycles for the application 564. Once the application 564 becomes active again, the Task Management module 540 can again provide access to the processor.

The Display Controller 544 is operable to render and output the display(s) for the multi-screen device. In embodiments, the Display Controller 544 creates and/or manages one or more frame buffers 548. A frame buffer 548 can be a display output that drives a display from a portion of memory containing a complete frame of display data. In embodiments, the Display Controller 544 manages one or more frame buffers. One frame buffer may be a composite frame buffer that can represent the entire display space of both screens. This composite frame buffer can appear as a single frame to the OS 516. The Display Controller 544 can sub-divide this composite frame buffer as required for use by each of the displays 110, 114. Thus, by using the Display Controller 544, the device 100 can have multiple screen displays without changing the underlying software of the OS 516.

The Application Manager 562 can be a service that provides the presentation layer for the window environment. Thus, the Application Manager 562 provides the graphical model for rendering by the Window Management Module 556. Likewise, the Desktop 566 provides the presentation layer for the Application Store 560. Thus, the desktop provides a graphical model of a surface having selectable application icons for the applications 564 in the Application Store 560 that can be provided to the Window Management Module 556 for rendering.

Figure 5B:
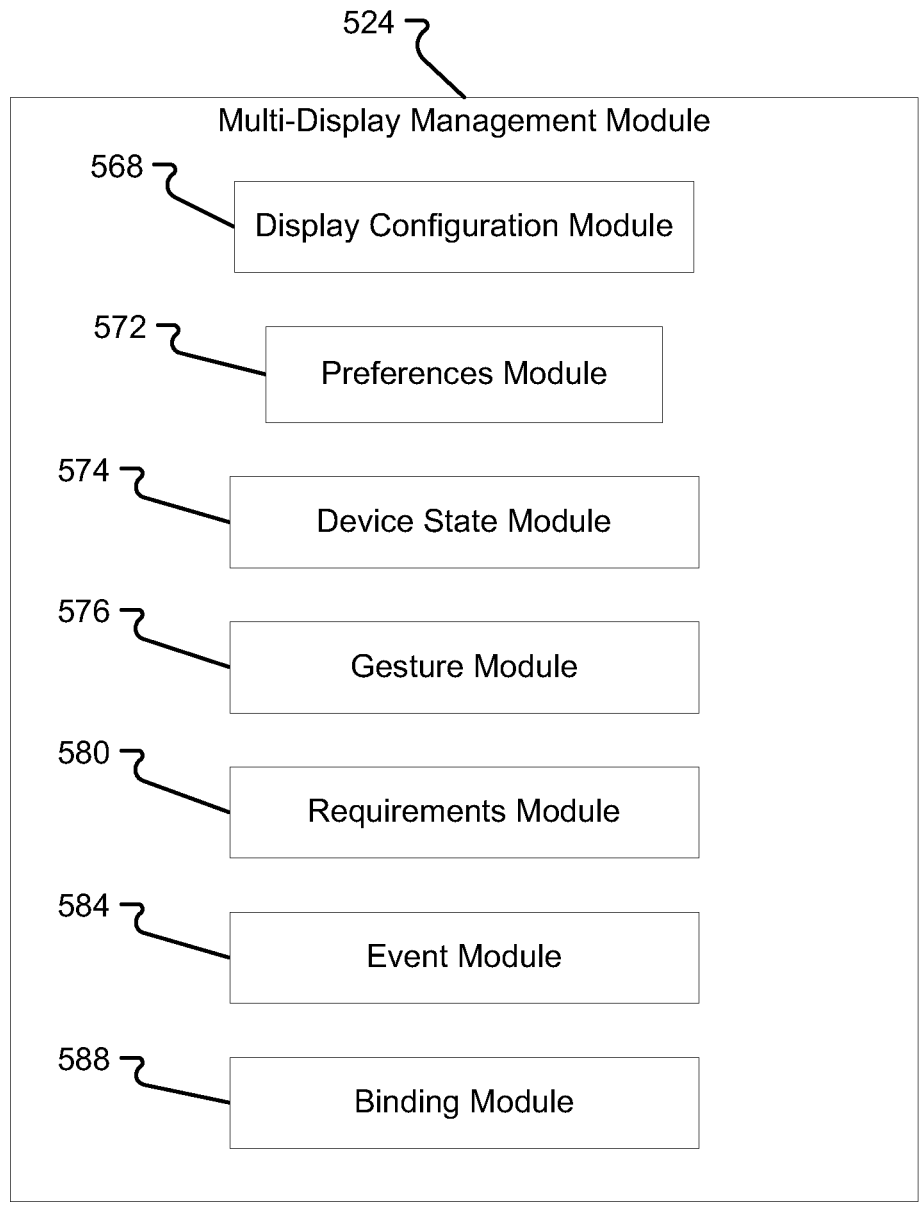
FIG. 5B is a second block diagram of an embodiment of the software and/or firmware for a device 100.

An embodiment of the MDM module 524 is shown in FIG. 5B. The MDM module 524 is operable to determine the state of the environment for the device, including, but not limited to, the orientation of the device, what applications 564 are executing, how the applications 564 are to be displayed, what actions the user is conducting, the tasks being displayed, etc. To configure the display, the MDM module 524 interprets these environmental factors and determines a display configuration, as described in conjunction with FIGS. 6A-6J. Then, the MDM module 524 can bind the applications 564 or other device components to the displays. The configuration may then be sent to the Display Controller 544 and/or the OS 516 to generate the display. The MDM module 524 can include one or more of, but is not limited to, a Display Configuration Module 568, a Preferences Module 572, a Device State Module 574, a Gesture Module 576, a Requirements Module 580, an Event Module 584, and/or a Binding Module 588.

The Display Configuration Module 568 determines the layout for the display. In embodiments, the Display Configuration Module 568 can determine the environmental factors. The environmental factors may be received from one or more other MDM module 524 modules or from other sources. The Display Configuration Module 568 can then determine from the list of factors the best configuration for the display. Some embodiments of the possible configurations and the factors associated therewith are described in conjunction with FIGS. 6A-6F.

The Preferences Module 572 is operable to determine display preferences for an application 564 or other component. For example, an application 564 can have a preference for Single or Dual displays. The Preferences Module 572 can determine or receive the application preferences and store the preferences. As the configuration of the device changes, the preferences may be reviewed to determine if a better display configuration can be achieved for the application 564.

The Device State Module 574 is operable to determine or receive the state of the device. The state of the device can be as described in conjunction with FIGS. 3A and 3B. The state of the device can be used by the Display Configuration Module 568 to determine the configuration for the display. As such, the Device State Module 574 may receive inputs and interpret the state of the device. The state information is then provided to the Display Configuration Module 568.

The Gesture Module 576 is operable to determine if the user is conducting any actions on the user interface. Thus, the Gesture Module 576 can receive task information either from the task stack 552 or the Input Management module 536. Gestures may be as defined in accordance with FIGS. 4A through 4H. For example, moving a window causes the display to render a series of display frames that illustrate the window moving. The gesture associated with such user interface interaction can be received and interpreted by the Gesture Module 576. The information about the user gesture is then sent to the Task Management Module 540 to modify the display binding of the task.

The Requirements Module 580, similar to the Preferences Module 572, is operable to determine display requirements for an application 564 or other component. An application 564 can have a set display requirement that must be observed. Some applications 564 require a particular display orientation. For example, the application 564 known as "Angry Birds" can only be displayed in landscape orientation. This type of display requirement can be determined or received, by the Requirements Module 580. As the orientation of the device changes, the Requirements Module 580 can reassert the display requirements for the application 564. The Display Configuration Module 568 can generate a display configuration that is in accordance with the application display requirements, as provided by the Requirements Module 580.

The Event Module 584, similar to the Gesture Module 576, is operable to determine one or more events occurring with an application 564 or other component that can affect the user interface. Thus, the Gesture Module 576 can receive event information either from the event buffer 556 or the Task Management module 540. These events can change how the tasks are bound to the displays. For example, an email application 564 receiving an email can cause the display to render the new message in a secondary screen. The events associated with such application execution can be received and interpreted by the Event Module 584. The information about the events then may be sent to the Display Configuration Module 568 to modify the configuration of the display.

The Binding Module 588 is operable to bind the applications 564 or the other components to the configuration determined by the Display Configuration Module 568. A binding associates, in memory, the display configuration for each application 564 with the display and mode of the application. Thus, the Binding Module 588 can associate an application 564 with a display configuration for the application (e.g. landscape, portrait, multi-screen, etc.). Then, the Binding Module 588 may assign a display identifier to the display. The display identifier associated the application 564 with a particular screen of the device. This binding is then stored and provided to the Display Controller 544, the OS 516, or other components to properly render the display. The binding is dynamic and can change or be updated based on configuration changes associated with events, gestures, state changes, application preferences or requirements, etc.

User Interface Configurations:

With reference now to FIGS. 6A-J, various types of output configurations made possible by the device 100 will be described hereinafter.

Figure 6B:
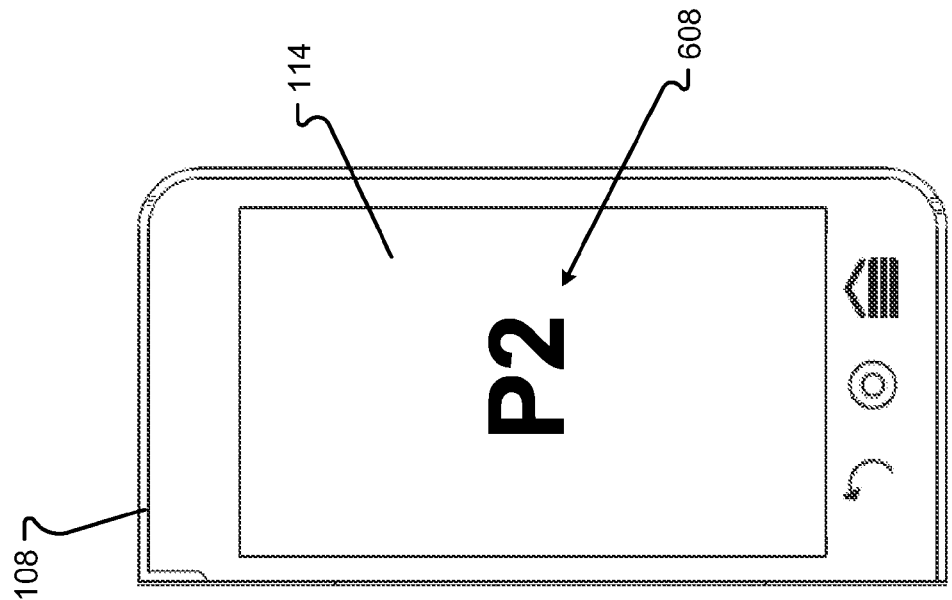
FIG. 6B is a second representation of an embodiment of a device configuration generated in response to the device state for a device 100.
Figure 6A:
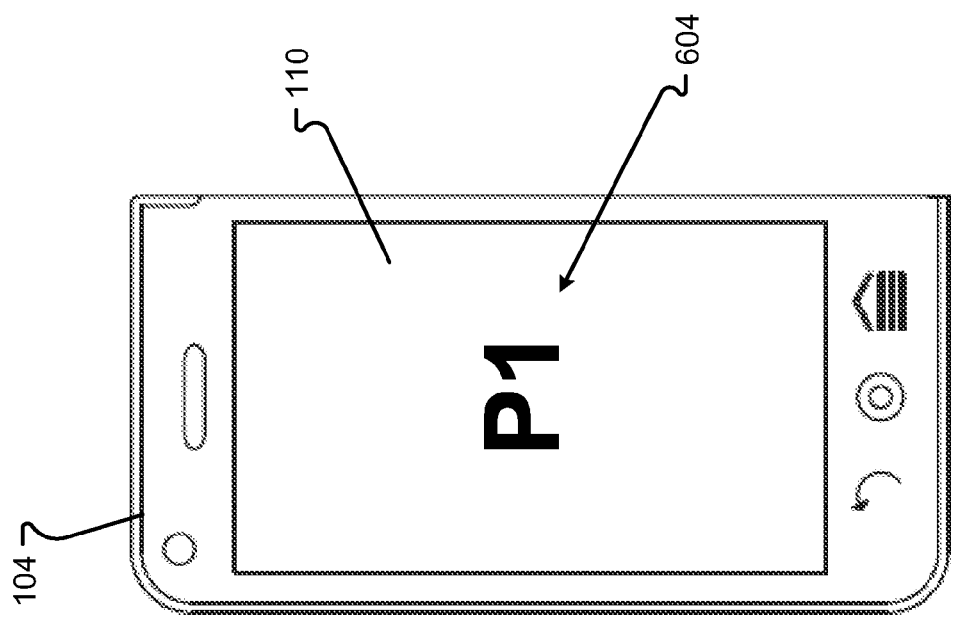
FIG. 6A is a first representation of an embodiment of a device configuration generated in response to the device state for a device 100.

FIGS. 6A and 6B depict two different output configurations of the device 100 being in a first state. Specifically, FIG. 6A depicts the device 100 being in a closed portrait state 304 where the data is displayed on the primary screen 104. In this example, the device 100 displays data via the touch sensitive display 110 in a first portrait configuration 604. As can be appreciated, the first portrait configuration 604 may only display a desktop or operating system home screen. Alternatively, one or more windows may be presented in a portrait orientation while the device 100 is displaying data in the first portrait configuration 604.

FIG. 6B depicts the device 100 still being in the closed portrait state 304, but instead data is displayed on the secondary screen 108. In this example, the device 100 displays data via the touch sensitive display 114 in a second portrait configuration 608.

It may be possible to display similar or different data in either the first or second portrait configuration 604, 608. It may also be possible to transition between the first portrait configuration 604 and second portrait configuration 608 by providing the device 100 with a user gesture (e.g., a double tap), a menu selection, or other means. Other suitable gestures may also be employed to transition between configurations. Furthermore, it may also be possible to transition the device 100 from the first or second portrait configuration 604, 608 to any other configuration described herein depending upon which state the device 100 is moved.

Figure 6C:
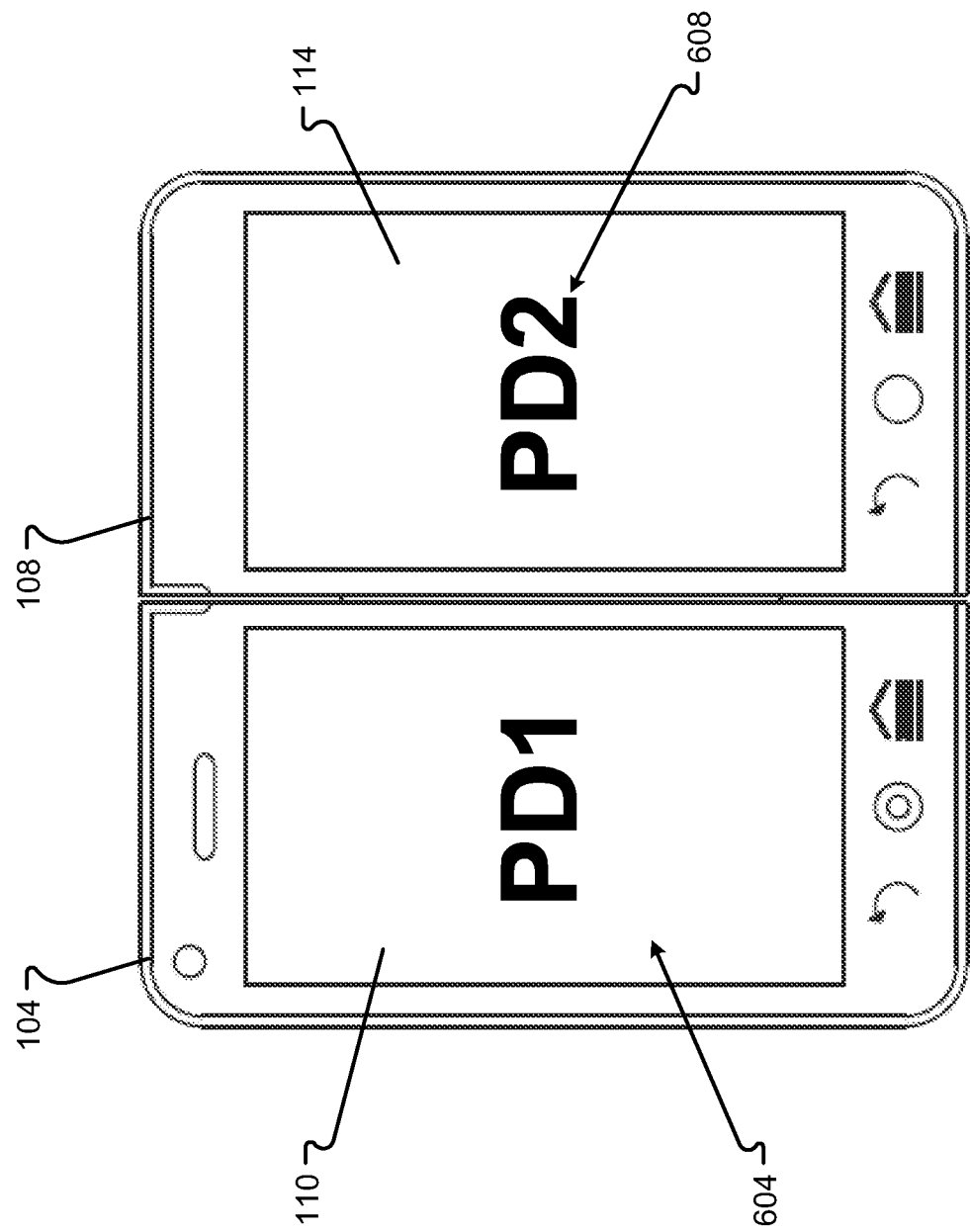
FIG. 6C is a third representation of an embodiment of a device configuration generated in response to the device state for a device 100.

An alternative output configuration may be accommodated by the device 100 being in a second state. Specifically, FIG. 6C depicts a third portrait configuration where data is displayed simultaneously on both the primary screen 104 and the secondary screen 108. The third portrait configuration may be referred to as a Dual-Portrait (DP) output configuration. In the DP output configuration, the touch sensitive display 110 of the primary screen 104 depicts data in the first portrait configuration 604 while the touch sensitive display 114 of the secondary screen 108 depicts data in the second portrait configuration 608. The simultaneous presentation of the first portrait configuration 604 and the second portrait configuration 608 may occur when the device 100 is in an open portrait state 320. In this configuration, the device 100 may display one application window in one display 110 or 114, two application windows (one in each display 110 and 114), one application window and one desktop, or one desktop. Other configurations may be possible. It should be appreciated that it may also be possible to transition the device 100 from the simultaneous display of configurations 604, 608 to any other configuration described herein depending upon which state the device 100 is moved. Furthermore, while in this state, an application's display preference may place the device into bilateral mode, in which both displays are active to display different windows in the same application 564. For example, a Camera application 564 may display a viewfinder and controls on one side, while the other side displays a mirrored preview that can be seen by the photo subjects. Games involving simultaneous play by two players may also take advantage of bilateral mode.

Figure 6E:
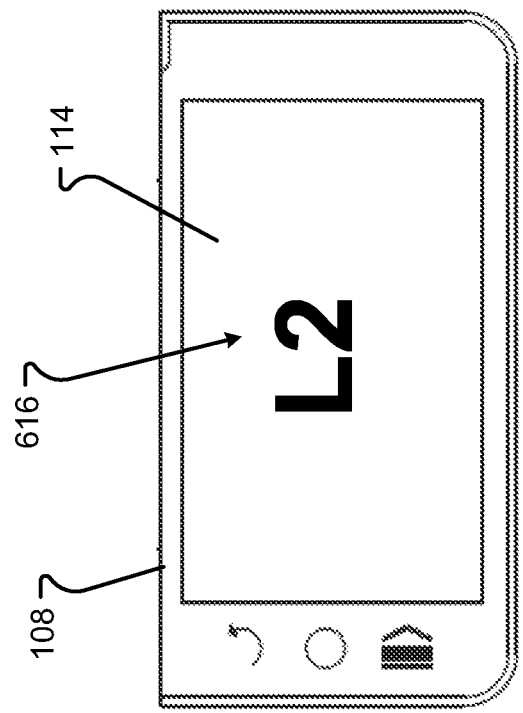
FIG. 6E is a fifth representation of an embodiment of a device configuration generated in response to the device state for a device 100.
Figure 6D:
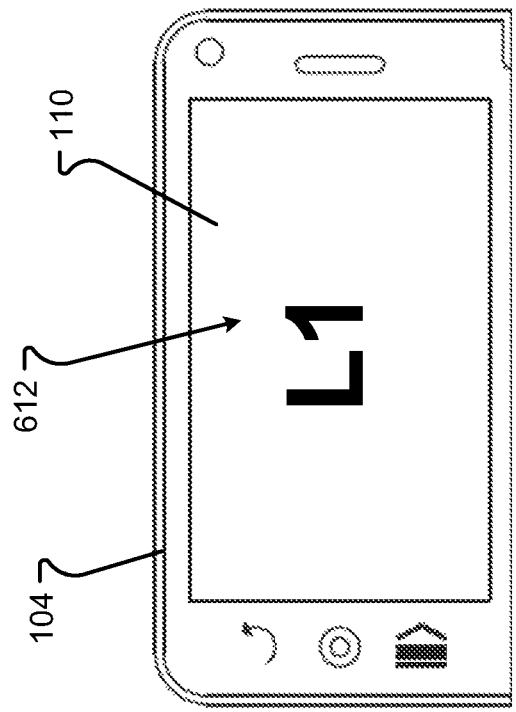
FIG. 6D is a fourth representation of an embodiment of a device configuration generated in response to the device state for a device 100.

FIGS. 6D and 6E depicts two further output configurations of the device 100 being in a third state. Specifically, FIG. 6D depicts the device 100 being in a closed landscape state 340 where the data is displayed on the primary screen 104. In this example, the device 100 displays data via the touch sensitive display 110 in a first landscape configuration 612. Much like the other configurations described herein, the first landscape configuration 612 may display a desktop, a home screen, one or more windows displaying application data, or the like.

FIG. 6E depicts the device 100 still being in the closed landscape state 340, but instead data is displayed on the secondary screen 108. In this example, the device 100 displays data via the touch sensitive display 114 in a second landscape configuration 616. It may be possible to display similar or different data in either the first or second portrait configuration 612, 616. It may also be possible to transition between the first landscape configuration 612 and second landscape configuration 616 by providing the device 100 with one or both of a twist and tap gesture or a flip and slide gesture. Other suitable gestures may also be employed to transition between configurations. Furthermore, it may also be possible to transition the device 100 from the first or second landscape configuration 612, 616 to any other configuration described herein depending upon which state the device 100 is moved.

Figure 6F:
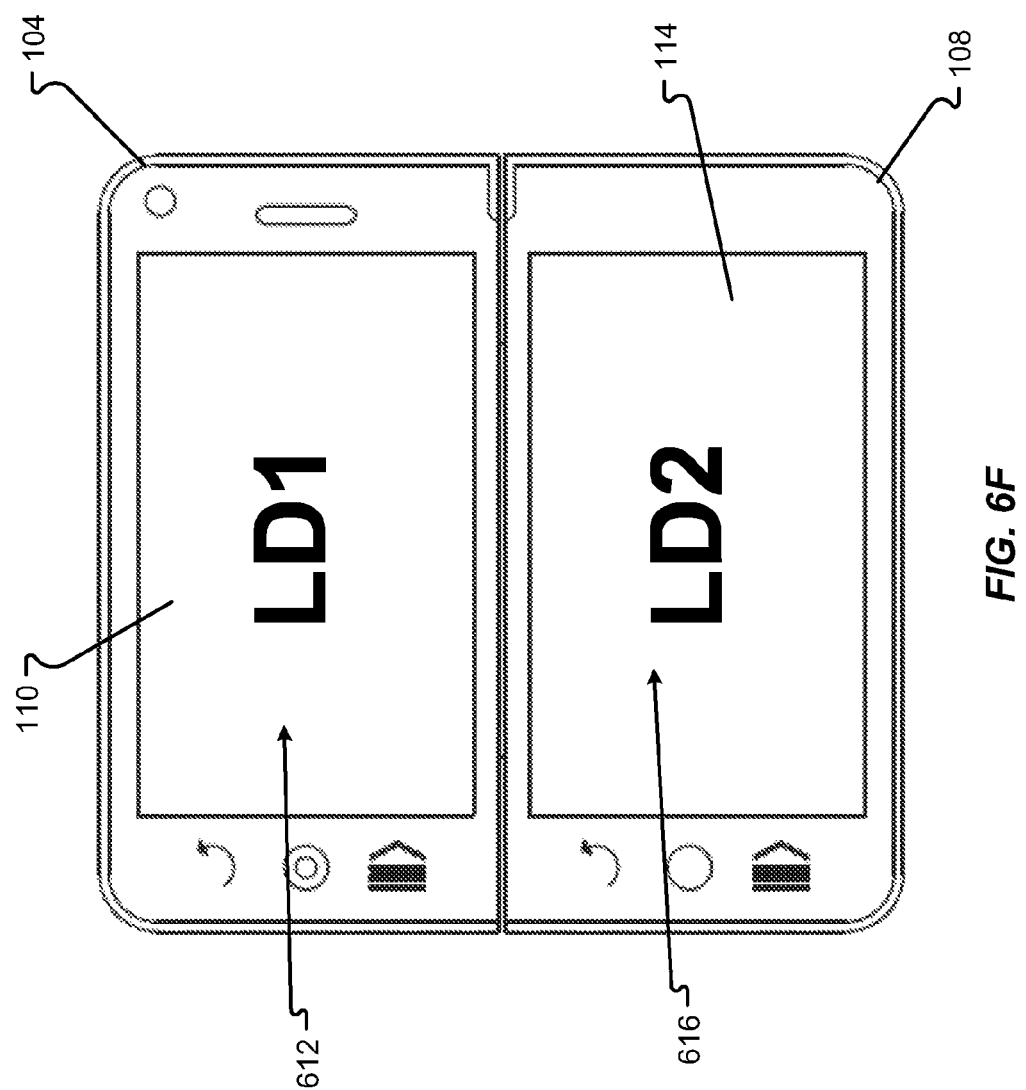
FIG. 6F is a sixth representation of an embodiment of a device configuration generated in response to the device state for a device 100.

FIG. 6F depicts a third landscape configuration where data is displayed simultaneously on both the primary screen 104 and the secondary screen 108. The third landscape configuration may be referred to as a Dual-Landscape (LD) output configuration. In the LD output configuration, the touch sensitive display 110 of the primary screen 104 depicts data in the first landscape configuration 612 while the touch sensitive display 114 of the secondary screen 108 depicts data in the second landscape configuration 616. The simultaneous presentation of the first landscape configuration 612 and the second landscape configuration 616 may occur when the device 100 is in an open landscape state 340. It should be appreciated that it may also be possible to transition the device 100 from the simultaneous display of configurations 612, 616 to any other configuration described herein depending upon which state the device 100 is moved.

FIGS. 6G and 6H depict two views of a device 100 being in yet another state. Specifically, the device 100 is depicted as being in an easel state 312. FIG. 6G shows that a first easel output configuration 618 may be displayed on the touch sensitive display 110. FIG. 6H shows that a second easel output configuration 620 may be displayed on the touch sensitive display 114. The device 100 may be configured to depict either the first easel output configuration 618 or the second easel output configuration 620 individually. Alternatively, both the easel output configurations 618, 620 may be presented simultaneously. In some embodiments, the easel output configurations 618, 620 may be similar or identical to the landscape output configurations 612, 616. The device 100 may also be configured to display one or both of the easel output configurations 618, 620 while in a modified easel state 316. It should be appreciated that simultaneous utilization of the easel output configurations 618, 620 may facilitate two-person games (e.g., Battleship®, chess, checkers, etc.), multi-user conferences where two or more users share the same device 100, and other applications 564. As can be appreciated, it may also be possible to transition the device 100 from the display of one or both configurations 618, 620 to any other configuration described herein depending upon which state the device 100 is moved.

Figure 6I:
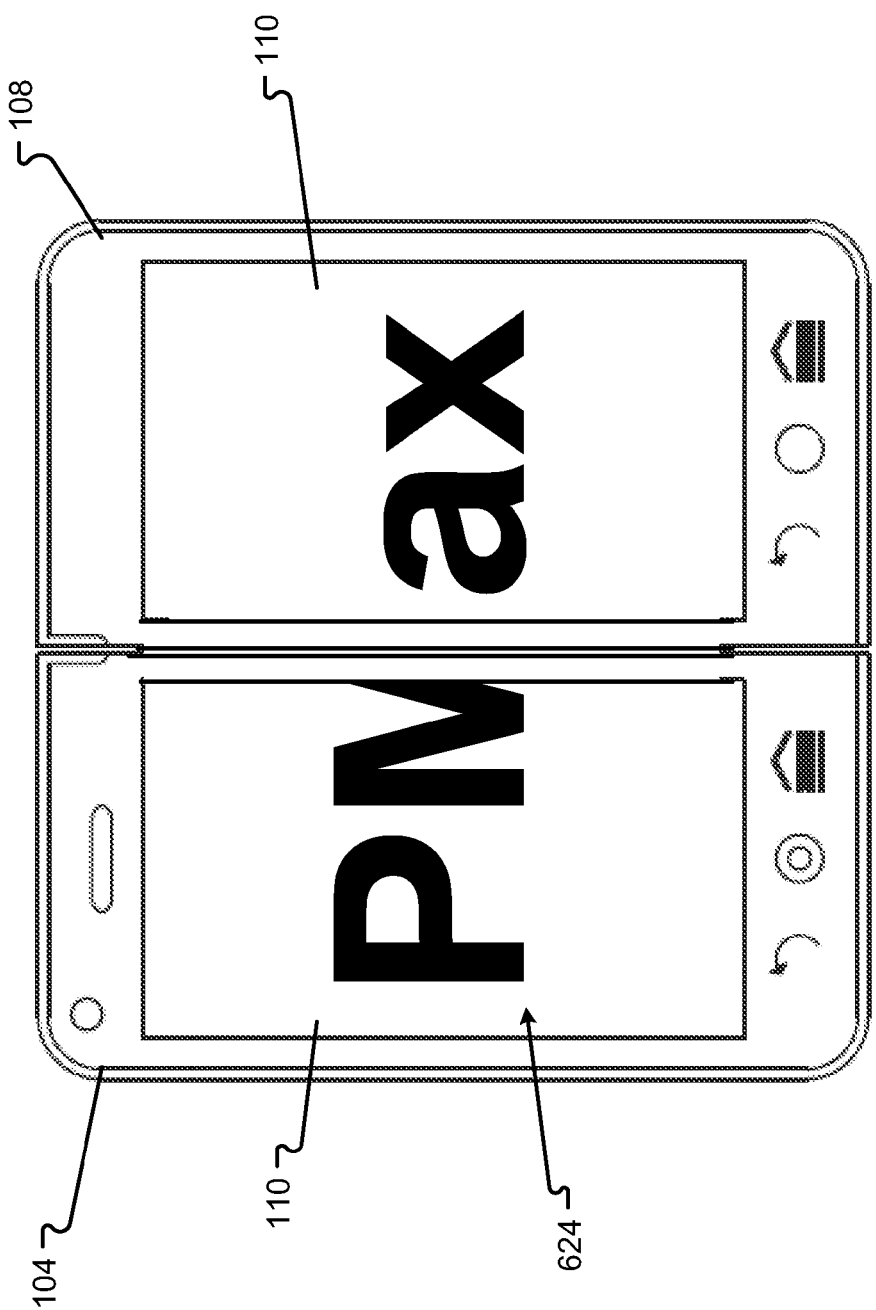
FIG. 6I is a ninth representation of an embodiment of a device configuration generated in response to the device state for a device 100.

FIG. 6I depicts yet another output configuration that may be accommodated while the device 100 is in an open portrait state 320. Specifically, the device 100 may be configured to present a single continuous image across both touch sensitive displays 110, 114 in a portrait configuration referred to herein as a Portrait-Max (PMax) configuration 624. In this configuration, data (e.g., a single image, application, window, icon, video, etc.) may be split and displayed partially on one of the touch sensitive displays while the other portion of the data is displayed on the other touch sensitive display. The Pmax configuration 624 may facilitate a larger display and/or better resolution for displaying a particular image on the device 100. Similar to other output configurations, it may be possible to transition the device 100 from the Pmax configuration 624 to any other output configuration described herein depending upon which state the device 100 is moved.

Figure 6J:
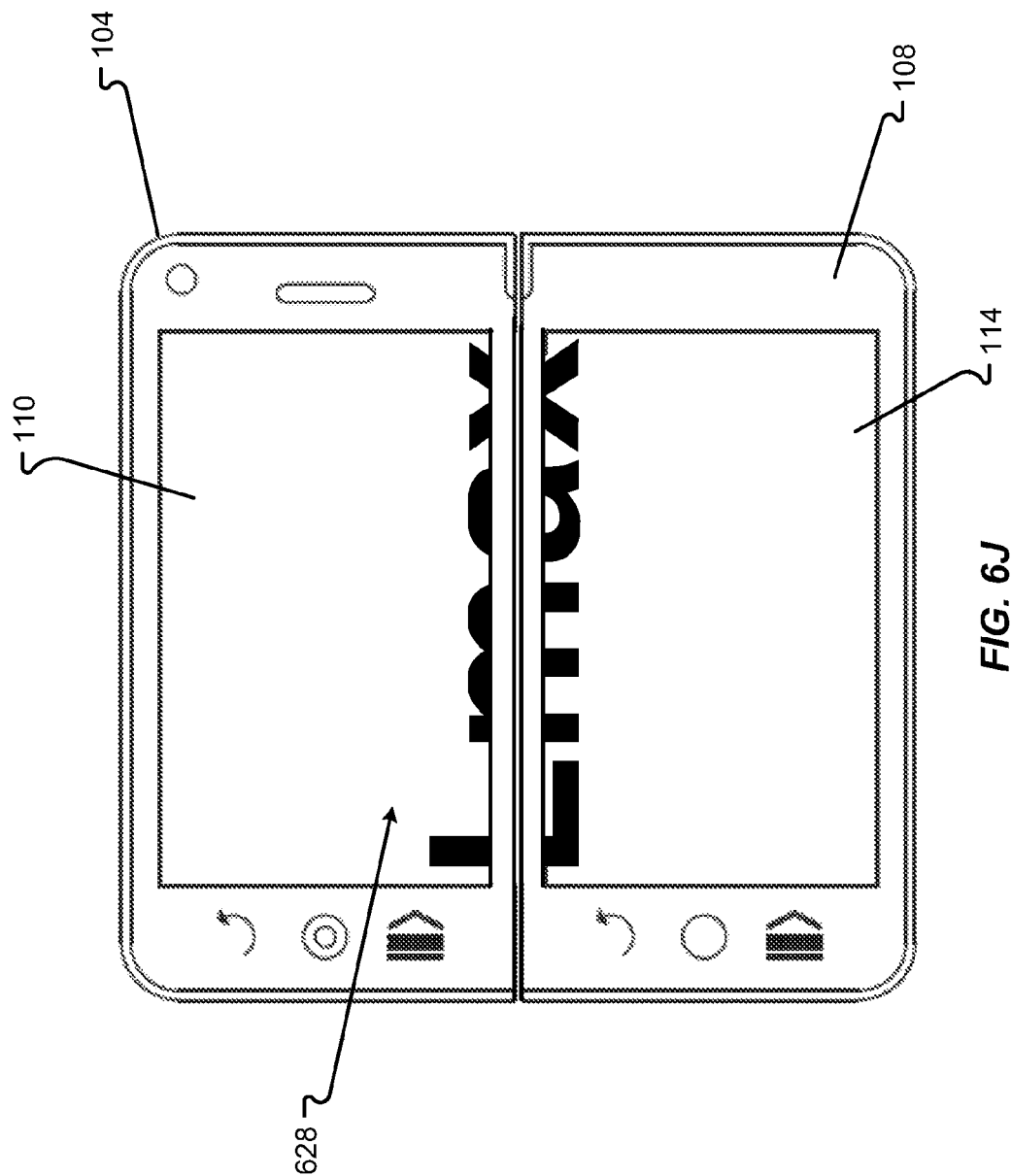
FIG. 6J is a tenth representation of an embodiment of a device configuration generated in response to the device state for a device 100.

FIG. 6J depicts still another output configuration that may be accommodated while the device 100 is in an open landscape state 348. Specifically, the device 100 may be configured to present a single continuous image across both touch sensitive displays 110, 114 in a landscape configuration referred to herein as a Landscape-Max (LMax) configuration 628. In this configuration, data (e.g., a single image, application, window, icon, video, etc.) may be split and displayed partially on one of the touch sensitive displays while the other portion of the data is displayed on the other touch sensitive display. The Lmax configuration 628 may facilitate a larger display and/or better resolution for displaying a particular image on the device 100. Similar to other output configurations, it may be possible to transition the device 100 from the Lmax configuration 628 to any other output configuration described herein depending upon which state the device 100 is moved.

Figure 7A:
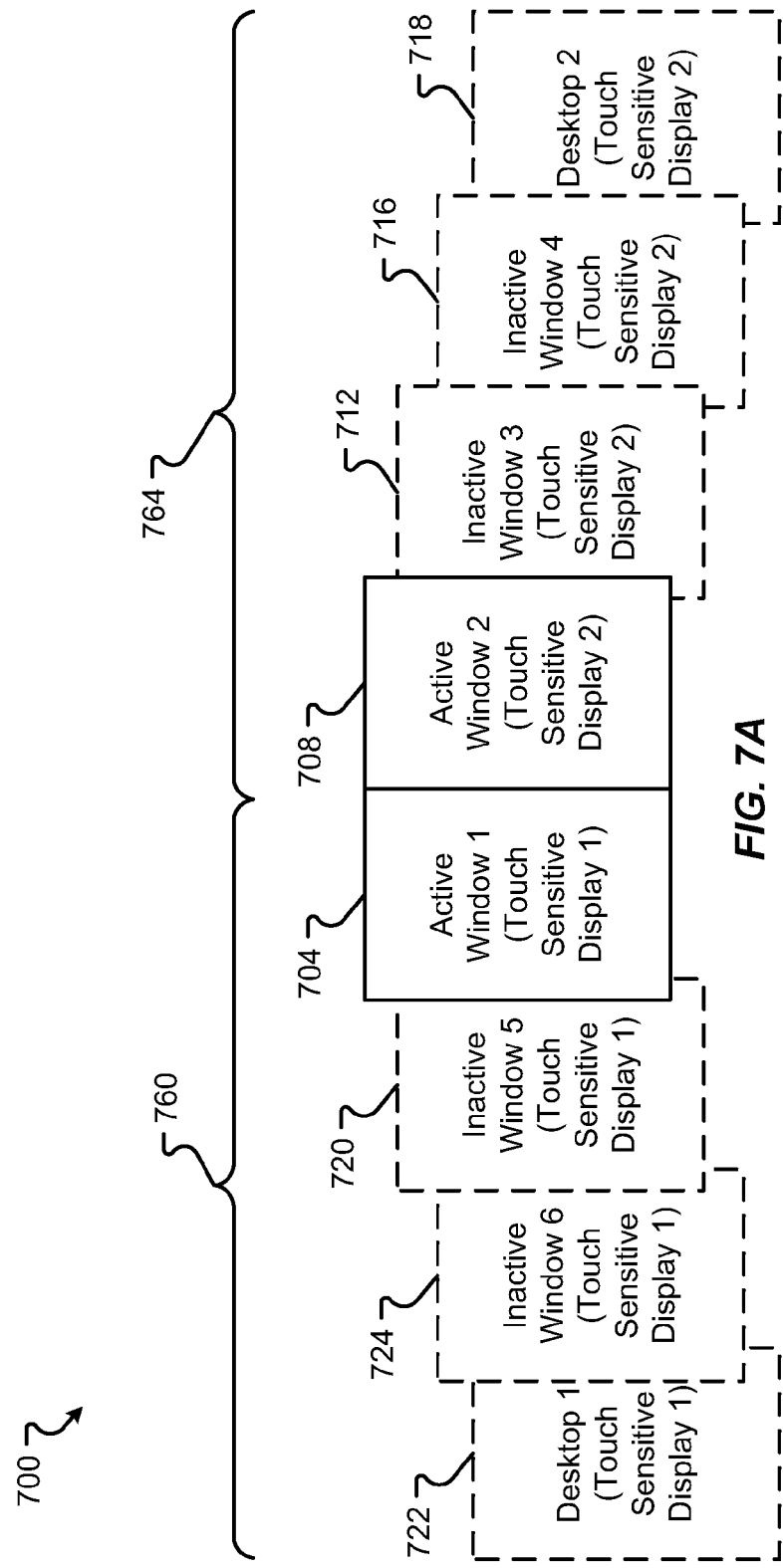
FIG. 7A representation of a logical window stack.
Figure 7B:
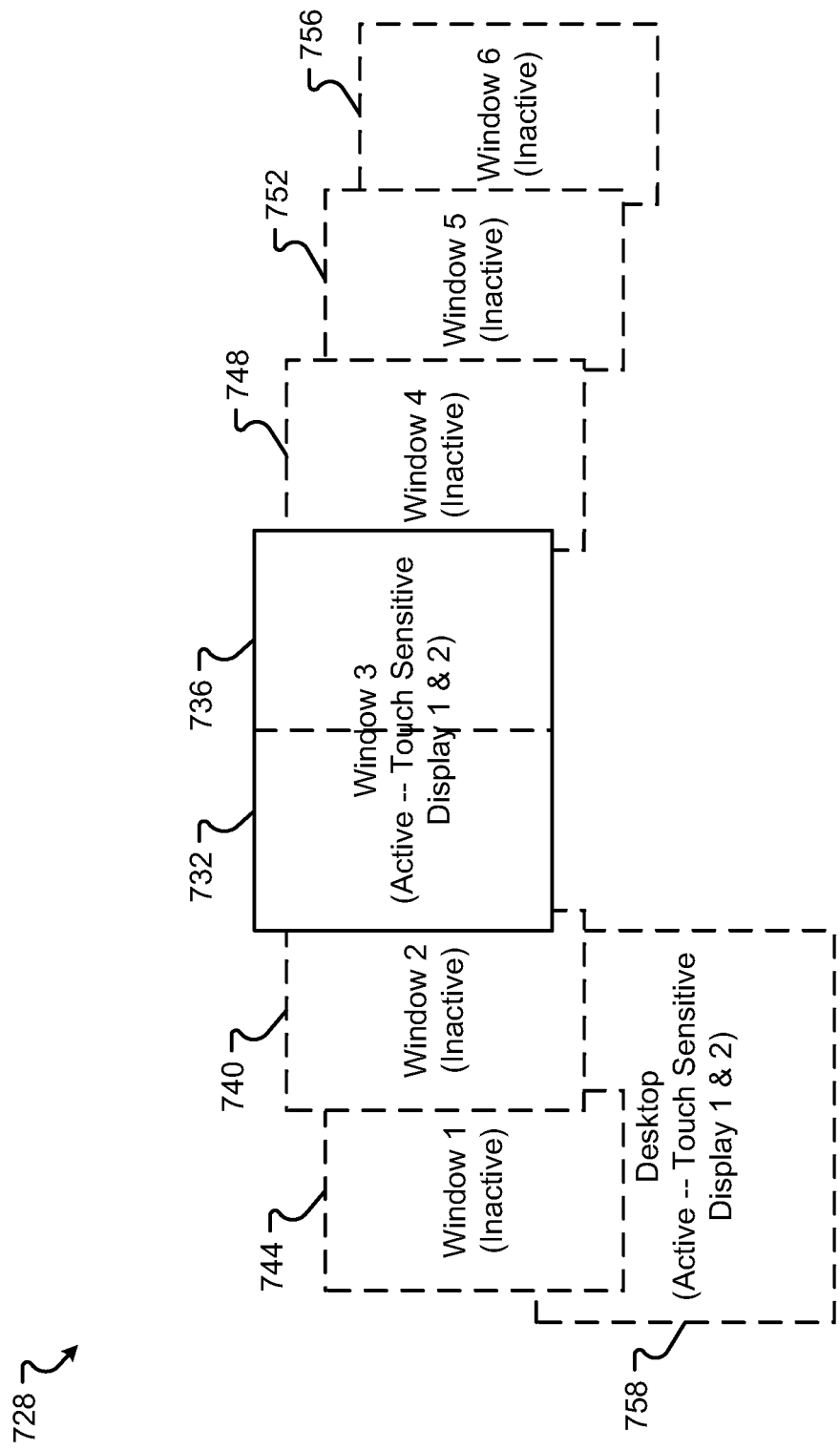
FIG. 7B is another logical window stack.

The device 100 manages desktops and/or windows with at least one window stack 700, 728, as shown in FIGS. 7A and 7B. A window stack 700, 728 is a logical arrangement of active and/or inactive windows for a multi-screen device. For example, the window stack 700 or 728 may be logically similar to a deck of cards, where one or more windows or desktops are arranged in order, as shown in FIGS. 7A and 7B. An active window is a window that is currently being displayed on at least one of the touch sensitive displays 110, 114. For example, windows displayed on the touch sensitive displays 104 and 108 are active windows. An inactive window is a window that was opened and displayed but is now "behind" an active window and not being displayed. In embodiments, an inactive window may be for an application 564 that is suspended, and thus, the window is not displaying active content. For example, windows 712, 716, 720, and 724 (FIG. 7A) are inactive windows.

A window stack 700, 728 may have various arrangements or organizational structures. In the embodiment shown in FIG. 7A, the device 100 includes a first stack 760 associated with the first touch sensitive display 110 and a second stack 764 associated with the second touch sensitive display 114. Thus, each touch sensitive display 110 and 114 can have an associated respective window stack 760, 764. These two window stacks 760, 764 may have different numbers of windows arranged in the respective stacks 760, 764. Further, the two window stacks 760, 764 can also be identified differently and managed separately. Thus, the first window stack 760 can be arranged in order from a first window 704 to a next window 720 to a last window 724 and finally to a desktop 722, which, in embodiments, is at the "bottom" of the window stack 760.

In embodiments, the desktop 722 is not always at the "bottom" since application windows can be arranged in the window stack below the desktop 722, and the desktop 722 can be brought to the "top" of a stack over other windows as a result of performing a desktop reveal operation. Likewise, the second stack 764 can be arranged from a first window 708 to a next window 712 to a last window 716, and finally to a desktop 718, which, in embodiments, is a single desktop area, with desktop 722, under all the windows in both window stack 760 and window stack 764. A logical data structure for managing the two window stacks 760, 764 may be as described in conjunction with FIG. 8 hereinbelow.

Another arrangement for a window stack 728 is shown in FIG. 7B. In this embodiment, there is a single window stack 728 for both touch sensitive displays 110, 114. Thus, the window stack 728 is arranged from a desktop 758 to a first window 744 to a last window 756. A window can be arranged in a position among all windows without an association to a specific touch sensitive display 110, 114. In this embodiment, each window is in the order of windows. Further, at least one window is identified as being active. For example, a single window may be rendered in two portions 732 and 736 that are displayed, respectively, on the first touch sensitive screen 110 and the second touch sensitive screen 114. This single window may only occupy a single position in the window stack 728 although it is displayed on both displays 110, 114.

Figure 7C:
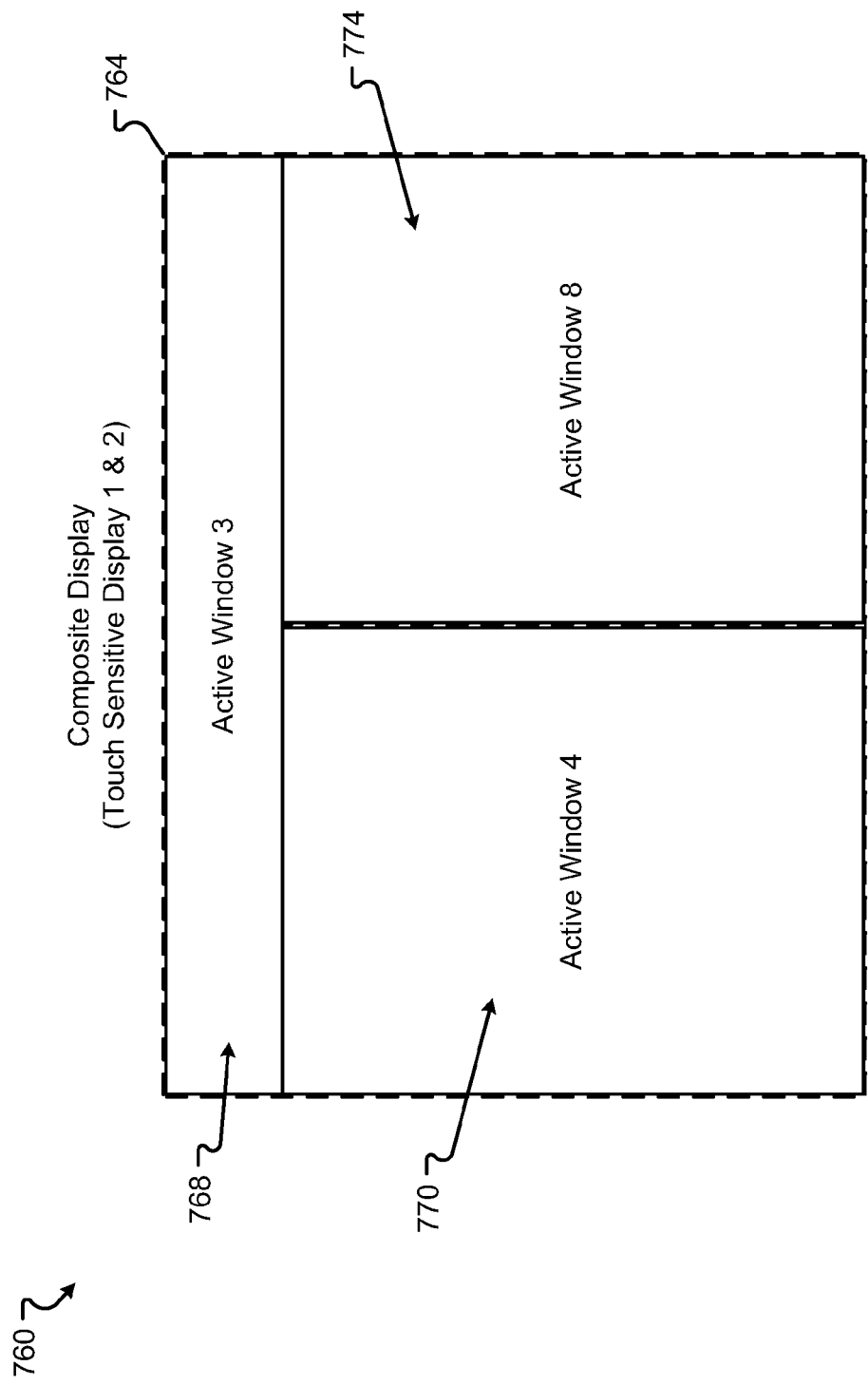
FIG. 7C is another representation of an embodiment of a logical window stack.
Figure 7D:
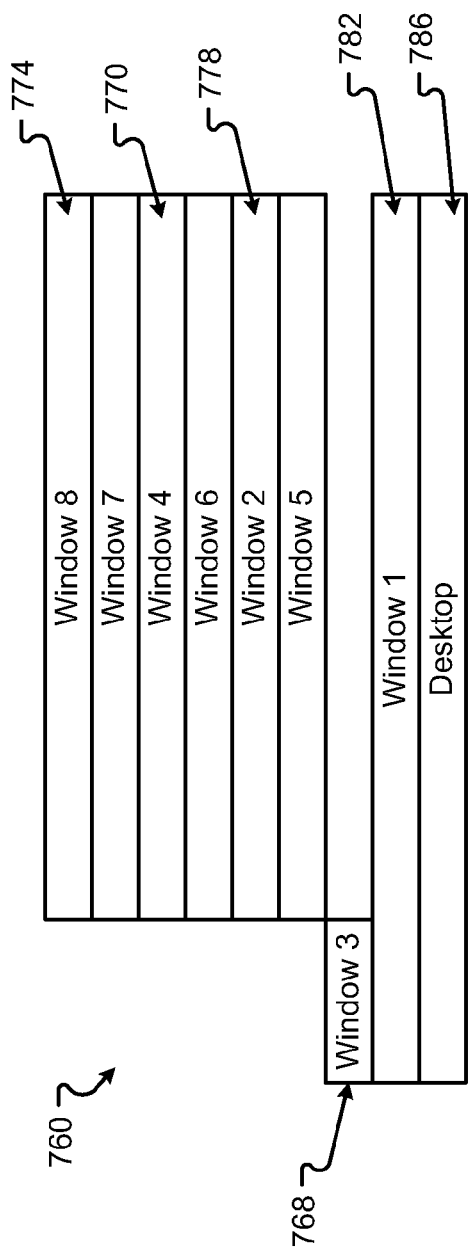
FIG. 7D is another representation of an embodiment of a logical window stack.
Figure 7E:
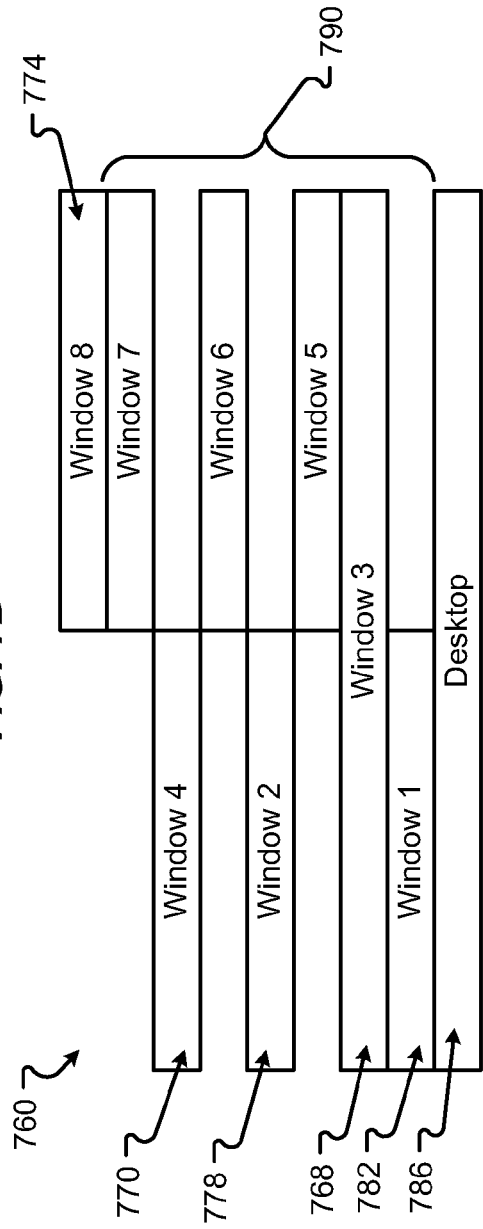
FIG. 7E is another representation of an embodiment of a logical window stack.

Yet another arrangement of a window stack 762 is shown in FIGS. 7C through 7E. The window stack 762 is shown in three "elevation" views. In FIG. 7C, the top of the window stack 762 is shown. Two sides of the window stack 762 are shown in FIGS. 7D and 7E. In this embodiment, the window stack 762 resembles a stack of bricks. The windows are stacked on each other. Looking from the top of the window stack 762 in FIG. 7C, only the top most windows in the window stack 762 are seen in different portions of the composite display 766. The composite display 766 represents a logical model for the entire display area of the device 100, which can include touch sensitive display 110 and touch sensitive display 114. A desktop 786 (FIGS. 7D and 7E) or a window can occupy part or all of the composite display 766.

In the embodiment shown, the desktop 786 is the lowest display or "brick" in the window stack 762. Thereupon, window 1 782, window 2 782, window 3 768, and window 4 770 are layered. Window 1 782, window 3 768, window 2 782, and window 4 770 only occupy a portion of the composite display 766. Thus, another part of the stack 762 includes window 8 774 and windows 5 through 7 shown in section 790. Only the top window in any portion of the composite display 766 is actually rendered and displayed. Thus, as shown in the top view in FIG. 7C, window 4 770, window 8 774, and window 3 768 are displayed as being at the top of the display in different portions of the window stack 762. A window can be dimensioned to occupy only a portion of the composite display 766 to "reveal" windows lower in the window stack 760. For example, window 3 768 is lower in the stack than both window 4 770 and window 8 774 but is still displayed. A logical data structure to manage the window stack can be as described in conjunction with FIG. 8.

When a new window is opened on the device 100, the newly activated window is generally positioned at the top of the stack. However, where and how the window is positioned within the stack can be a function of the orientation of the device 100, the context of what programs, functions, software, etc. are being executed on the device 100, how the stack is positioned when the new window is opened, etc. To insert the window in the stack, the position in the stack for the window is determined and the touch sensitive display 110, 114 to which the window is associated may also be determined. With this information, a logical data structure for the window can be created and stored. When user interface or other events or tasks change the arrangement of windows, the window stack(s) can be changed to reflect the change in arrangement. It should be noted that these same concepts described above can be used to manage the one or more desktops for the device 100.

Figure 8:
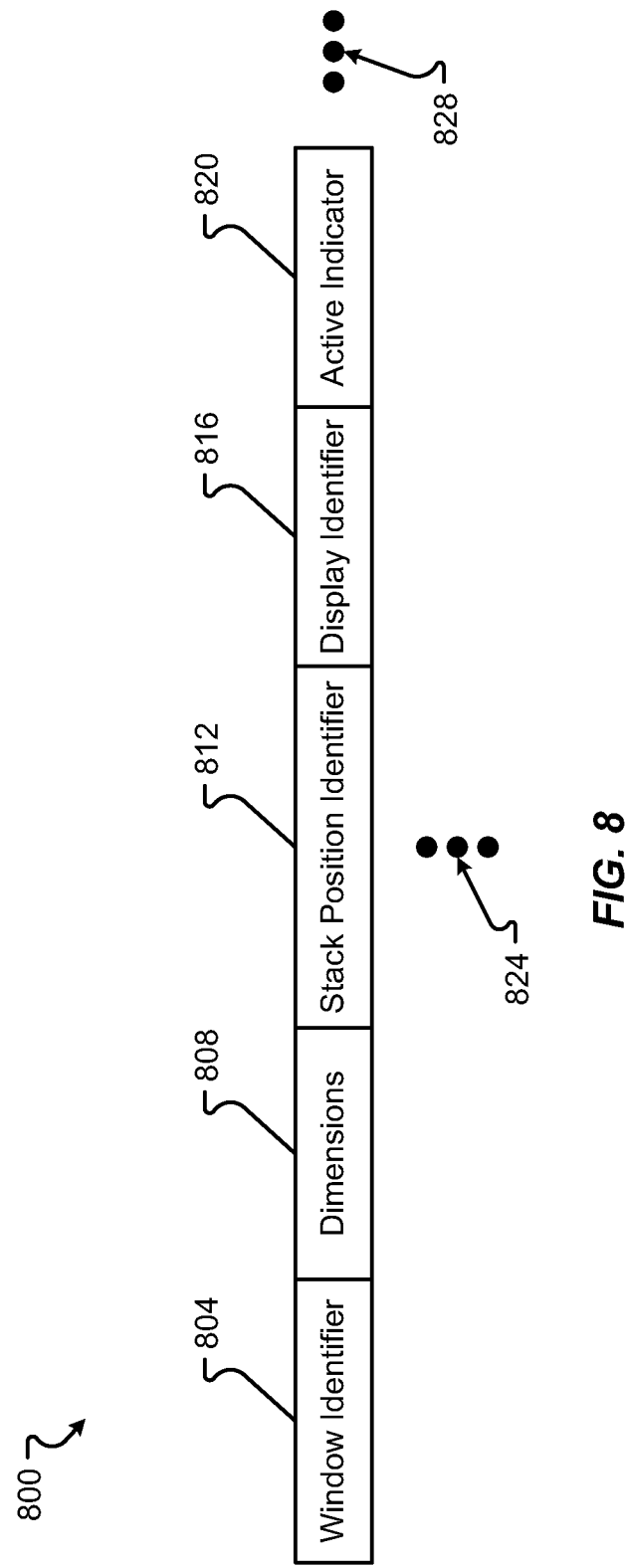
FIG. 8 is block diagram of an embodiment of a logical data structure for a window stack.

A logical data structure 800 for managing the arrangement of windows or desktops in a window stack is shown in FIG. 8. The logical data structure 800 can be any data structure used to store data whether an object, record, file, etc. The logical data structure 800 can be stored in any type of database or data storage system, regardless of protocol or standard. In embodiments, the logical data structure 800 includes one or more portions, fields, attributes, etc. that store data in a logical arrangement that allows for easy storage and retrieval of the information. Hereinafter, these one or more portions, fields, attributes, etc. shall be described simply as fields. The fields can store data for a window identifier 804, dimensions 808, a stack position identifier 812, a display identifier 816, and/or an active indicator 820. Each window in a window stack can have an associated logical data structure 800. While only a single logical data structure 800 is shown in FIG. 8, there may be more or fewer logical data structures 800 used with a window stack (based on the number of windows or desktops in the stack), as represented by ellipses 824. Further, there may be more or fewer fields than those shown in FIG. 8, as represented by ellipses 828.

A window identifier 804 can include any identifier (ID) that uniquely identifies the associated window in relation to other windows in the window stack. The window identifier 804 can be a globally unique identifier (GUID), a numeric ID, an alphanumeric ID, or other type of identifier. In embodiments, the window identifier 804 can be one, two, or any number of digits based on the number of windows that can be opened. In alternative embodiments, the size of the window identifier 804 may change based on the number of windows opened. While the window is open, the window identifier 804 may be static and remain unchanged.

Dimensions 808 can include dimensions for a window in the composite display 766. For example, the dimensions 808 can include coordinates for two or more corners of the window or may include one coordinate and dimensions for the width and height of the window. These dimensions 808 can delineate what portion of the composite display 766 the window may occupy, which may be the entire composite display 766 or only part of composite display 766. For example, window 4 770 may have dimensions 880 that indicate that the window 4 770 will occupy only part of the display area for composite display 766, as shown in FIG. 7C. As windows are moved or inserted in the window stack, the dimensions 808 may change.

A stack position identifier 812 can be any identifier that can identify the position in the stack for the window or may be inferred from the window's control record within a data structure, such as a list or a stack. The stack position identifier 812 can be a GUID, a numeric ID, an alphanumeric ID, or other type of identifier. Each window or desktop can include a stack position identifier 812. For example, as shown in the embodiment of FIG. 7A, window 1 704 in stack 1 760 can have a stack position identifier 812 of 1 identifying that window 704 is the first window in the stack 760 and the active window. Similarly, window 6 724 can have a stack position identifier 812 of 3 representing that window 724 is the third window in the stack 760. Window 2 708 can also have a stack position identifier 812 of 1 representing that window 708 is the first window in the second stack 764. However, in FIG. 7B, an alternative stack position numbering of windows is provided; i.e., window 1 744 can have a stack position identifier 812 of 1, window 3, rendered in portions 732 and 736, can have a stack position identifier 812 of 3, and window 6 756 can have a stack position identifier 812 of 6. Thus, depending on the type of stack, the stack position identifier 812 can represent a window's location in the stack.

A display identifier 816 can identify that the window or desktop is associated with a particular display, such as the first display 110 or the second display 114, or the composite display 760 composed of both displays. While this display identifier 816 may not be needed for a multi-stack system, as shown in FIG. 7A, the display identifier 816 can indicate whether a window in the serial stack of FIG. 7B is displayed on a particular display. Thus, window 3 may have two portions 732 and 736 in FIG. 7B. The first portion 732 may have a display identifier 816 for the first display while the second portion 736 may have a display identifier 816 for the second display 114. However, in alternative embodiments, the window may have two display identifiers 816 that represent that the window is displayed on both of the displays 110, 114, or a display identifier 816 identifying the composite display. In another alternate embodiment, the window may have a single display identifier 816 to represent that the window is displayed on both of the displays 110, 114.

Similar to the display identifier 816, an active indicator 820 may not be needed with the dual stack system of FIG. 7A, as the window in stack position 1 is active and displayed. In the system of FIG. 7B, the active indicator 820 can indicate which window(s) in the stack is being displayed. Thus, window 3 may have two portions 732 and 736 in FIG. 7B. The first portion 732 may have an active indicator 820 while the second portion 736 may also have an active indicator 820. However, in alternative embodiments, window 3 may have a single active indicator 820. The active indicator 820 can be a simple flag or bit that represents that the window is active or displayed.

Figure 9:
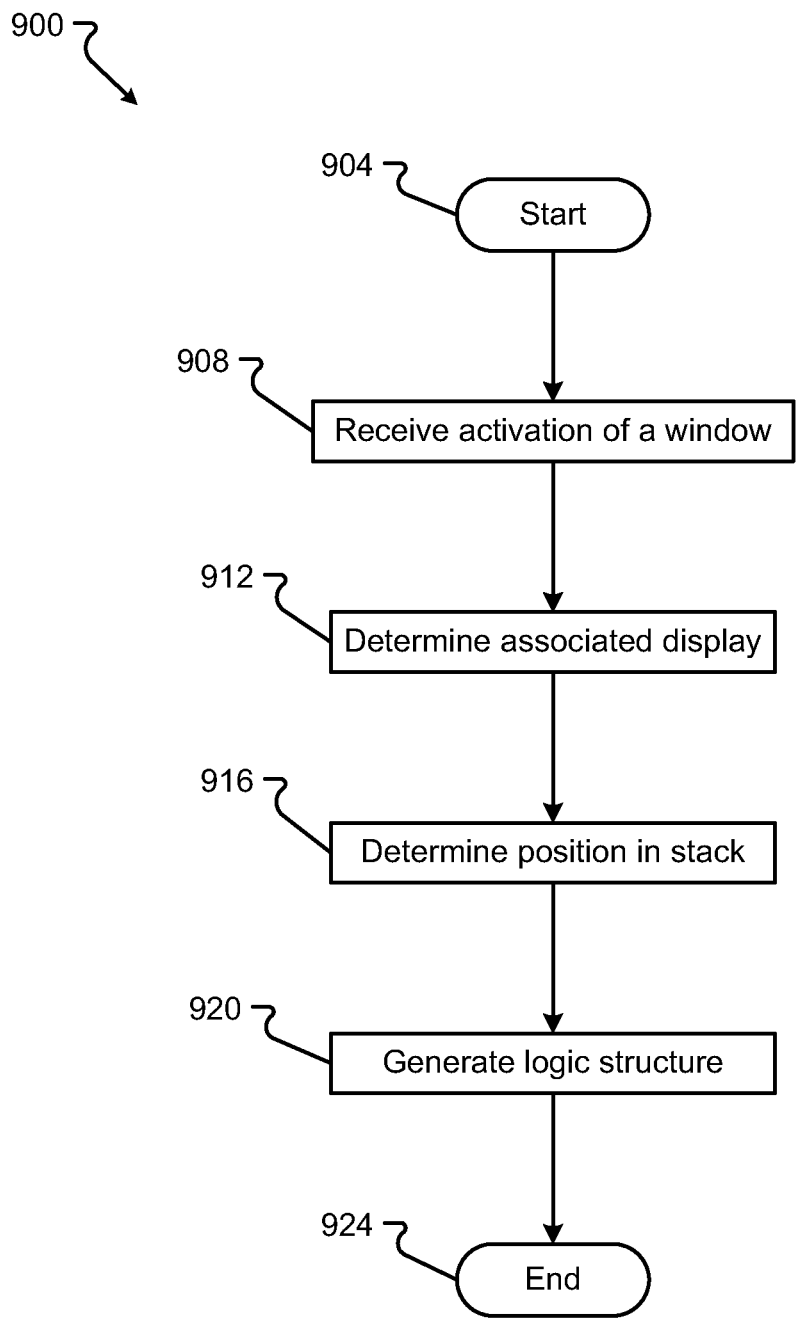
FIG. 9 is a flow chart of an embodiment of a method for creating a window stack.

An embodiment of a method 900 for creating a window stack is shown in FIG. 9. While a general order for the steps of the method 900 is shown in FIG. 9. Generally, the method 900 starts with a start operation 904 and ends with an end operation 928. The method 900 can include more or fewer steps or can arrange the order of the steps differently than those shown in FIG. 9. The method 900 can be executed as a set of computer-executable instructions executed by a computer system and encoded or stored on a computer readable medium. Hereinafter, the method 900 shall be explained with reference to the systems, components, modules, software, data structures, user interfaces, etc. described in conjunction with FIGS. 1-8.

A multi-screen device 100 can receive activation of a window, in step 908. In embodiments, the multi-screen device 100 can receive activation of a window by receiving an input from the touch sensitive display 110 or 114, the configurable area 112 or 116, a gesture capture region 120 or 124, or some other hardware sensor operable to receive user interface inputs. The processor may execute the Task Management Module 540 (FIG. 5A) to receive the input. The Task Management Module 540 can interpret the input as requesting an application task to be executed that will open a window in the window stack.

In embodiments, the Task Management Module 540 places the user interface interaction in the task stack 552 (FIG. 5A) to be acted upon by the Display Configuration Module 568 (FIG. 5B) of the Multi-Display Management Module 524 (FIGS. 5A, 5B). Further, the Task Management Module 540 waits for information from the Multi-Display Management Module 524 to send instructions to the Window Management Module 532 to create the window in the window stack.

The Multi-Display Management Module 524, upon receiving instruction from the Task Management Module 540, determines to which touch portion of the composite display 760, the newly activated window should be associated, in step 912. For example, window 4 770 is associated with the composite display 766 (FIG. 7A). In embodiments, the device state module 574 (FIG. 5B) of the Multi-Display Management Module 524 may determine how the device is oriented or in what state the device is in, e.g., open, closed, portrait, etc. Further, the preferences module 572 (FIG. 5B) and/or requirements module 580 (FIG. 5B) may determine how the window is to be displayed. The gesture module 576 (FIG. 5B) may determine the user's intentions about how the window is to be opened based on the type of gesture and the location of where the gesture is made.

The Display Configuration Module 568 (FIG. 5B) may use the input from these modules and evaluate the current window stack 760 to determine the best place and the best dimensions, based on a visibility algorithm, to open the window. Thus, the Display Configuration Module 568 determines the best place to put the window at the top of the window stack 760, in step 916. The visibility algorithm, in embodiments, determines for all portions of the composite display, which windows are at the top of the stack. For example, the visibility algorithm determines that window 3 768, window 4 770, and window 8 774 are at the top of the stack 760 as viewed in FIGS. 7C through 7E. Upon determining where to open the window, the Display Configuration Module 568 can assign a display identifier 816 and possibly dimensions 808 to the window. The display identifier 816 and dimensions 808 can then be sent back to the Task Management Module 540. The Task Management Module 540 may then assign the window a stack position identifier 812 indicating the windows position at the top of the window stack.

In embodiments, the Task Management Module 540 sends the window stack information and instructions to render the window to the Window Management Module 532 (FIG. 5A). The Window Management Module 532 and the Task Management Module 540 (FIG. 5A) can create the logical data structure 800, in step 924. Both the Task Management Module 540 and the Window Management Module 532 may create and manage copies of the window stack. These copies of the window stack can be synchronized or kept similar through communications between the Window Management Module 532 and the Task Management Module 540. Thus, the Window Management Module 532 and the Task Management Module 540, based on the information determined by the Multi-Display Management Module 524, can assign dimensions 808, a stack position identifier 812 (e.g., window 1 782, window 4 770, etc.), a display identifier 816 (e.g., touch sensitive display 1 110, touch sensitive display 2 114, composite display identifier, etc,), and an active indicator 820, which is generally always set when the window is at the "top" of the stack. The logical data structure 800 may then be stored by both the Window Management Module 532 and the Task Management Module 540. Further, the Window Management Module 532 and the Task Management Module 540 may thereinafter manage the window stack and the logical data structure(s) 800.

In at least one embodiment of the device 100, the MDM 524 (and its Gesture Module 576) may be operable for assisting the Window Management Module 532 in dragging and dropping the contexts of one application 564 to another via user gestures. In particular, to copy data from one location, or screen, to another the user presses and holds an area on the screen where the data that is desired to be copied is located; the data is then automatically highlighted and selected, then the user can drag the highlighted data to a destination location via finger gestures. This drag operation can cross over a first screen to a second screen where the data may be pasted. FIGS. 10A through 10D is illustrative of the present drag and drop feature of an embodiment of the device 100. Referring to FIG. 10A, the device 100 is shown in an open portrait state, wherein the display 110 displays a email application window 1004 for composing a new email to "Adam". Note that the content area 1008 of the email currently states "Here is the text:". The display 114 shows an illustrative presentation of an Internet browser window 1012, wherein the URL for the webpage being displayed is "www.flextronics.com", and at least a portion of the contents of the webpage is shown in the browser display area/frame 1016 In FIG. 10B, a user inputs a user gesture 1020 into the display area/frame 1016 for selecting the contents thereof. In the presently illustrated embodiment, the user gesture 1020 is a two finger press and hold gesture (e.g., a two finger "long press" 424, FIG. 4B), wherein the user presses with two fingers and maintains the finger pressure on the display with both fingers for, e.g., at least two seconds for thereby selecting the contents of the display area/frame 1016 In FIG. 10B, this two finger press and hold gesture 1020 is represented by the pair of concentric circles 1024. However, it is within the scope of the present disclosure that other/alternative user gestures may be used to select the contents of a display area/frame, e.g., 1016. For example, instead (or in addition to) the Gesture Module 576 being programmed to recognize the two finger press and hold gesture 1020 for selecting the contents of a display area/frame, the Gesture Module may be programmed to recognize a single finger press and hold combined with a finger tap 420 for selecting such contents. Note that the user could have selected the URL area/frame 1028 instead of the area/frame 1016 if the user gesture 1020 would have been applied to the URL area/frame. Further note that in order for the Window Management Module 532 to identify the particular area/frame in which the user gesture 1020 is being applied, the MDM, it may be necessary for the MDM to not only interrogate the window stack for the display (110 or 114) to which the user gesture is being input (for determining, e.g., the window in which the gesture is being input), but also interrogate the display data structure for the application window selected for determining the (any) frame within the application window to select.

Once the Gesture Module 576 recognizes the user gesture 1020 for selecting the area/frame of an application window (e.g., window 1012), the selected area/frame may be highlighted (or alternatively, only its border may be highlighted) on its display (110 or 114) so that the user receives feedback as to what portion of the screen display has been (or will be) copied into another application window. In FIG. 10B, border of the browser display area/frame 1016 is identified by a thick line width to indicate that this display area/frame has been selected by the Window Management Module 532.

Note that for hierarchical display areas/frames, the first area/frame selected by the Window Management Module 532 may be larger or smaller than what the user desires to copy. Accordingly, embodiments may allow the user to input additional gestures for selecting the desired portion of a display area/frame. For example, the user may cease the press and hold gesture with one of his/her fingers, and use this finger to quickly tap the display (110 or 114) for selecting another display area/frame within the hierarchy of display areas/frames, which would be highlighted instead of the previously selected display area/frame from the hierarchy. Thus, the user may precisely select the content to be copied into the display of another application 564.

Once the desired display area/frame is selected for copying, the user may drag his/her fingers that are pressing on the display area/frame (e.g., 1016) to be copied so that the termination of the drag identifies the window (or display area/frame thereof) of the target application 564 in which the selected information is to be copied. FIG. 10C is illustrative of this. In particular, drag gesture 1030 is a representation of a drag of the user gesture 1020, wherein FIG. 10C further illustrates the user dragging of the user gesture 1020 from the display 114 to the drag termination location 1032 in the display 110 thereby designating to the Window Management Module 532 the target display area/frame 1008 in which to copy the information selected from display area/frame 1016. Note that the drag gesture 1030 may commence by moving the gesture 1020 across the display 100 substantially without releasing contact for touching the display 110; e.g., it may be determined that there is substantially no release of display 110 contact in transitioning from the gesture 1020 to the drag gesture 1030 if it is detected at least every 0.1 milliseconds. Moreover, in one embodiment, the selected information is copied as it resides in memory 508; e.g., text is copied as text data, pictures are copied as picture data so that data manipulations can be performed (to the degree such are supported) in the target application 564. Thus, the device 100 allows displayed information (e.g., image, text, etc.) to be selected with a simple user gesture and dragged to a new location without requiring additional user steps or lifting of the user's fingers or stylus from the displays 110 and 114. Moreover, the copied information can be copied and pasted to a different display 110 or 114 of the device by the drag user gesture 1030 extending onto both the displays 110 and 114. Note that in one embodiment, the drag user gesture may be accompanied with a corresponding drag of an image of the information to be pasted into the target application 564. In particular, the drag image may be generated as a reduced size replica of the selected information, and/or as a semi-transparent replica of the selected information wherein the user performing the drag can both recognize what is being dragged (for pasting), and identify the displayed presentations over which the drag image is being dragged.

Accordingly, FIG. 10D shows the resulting configuration of the displays 110 and 114 after the text of browser display area/frame 1016 is copied and pasted into the email application window 1004 (and more particularly, into the email content area 1008. Note that browser display area/frame 1016 is not longer highlighted since the drag and drop operation has been completed.

Figure 11:
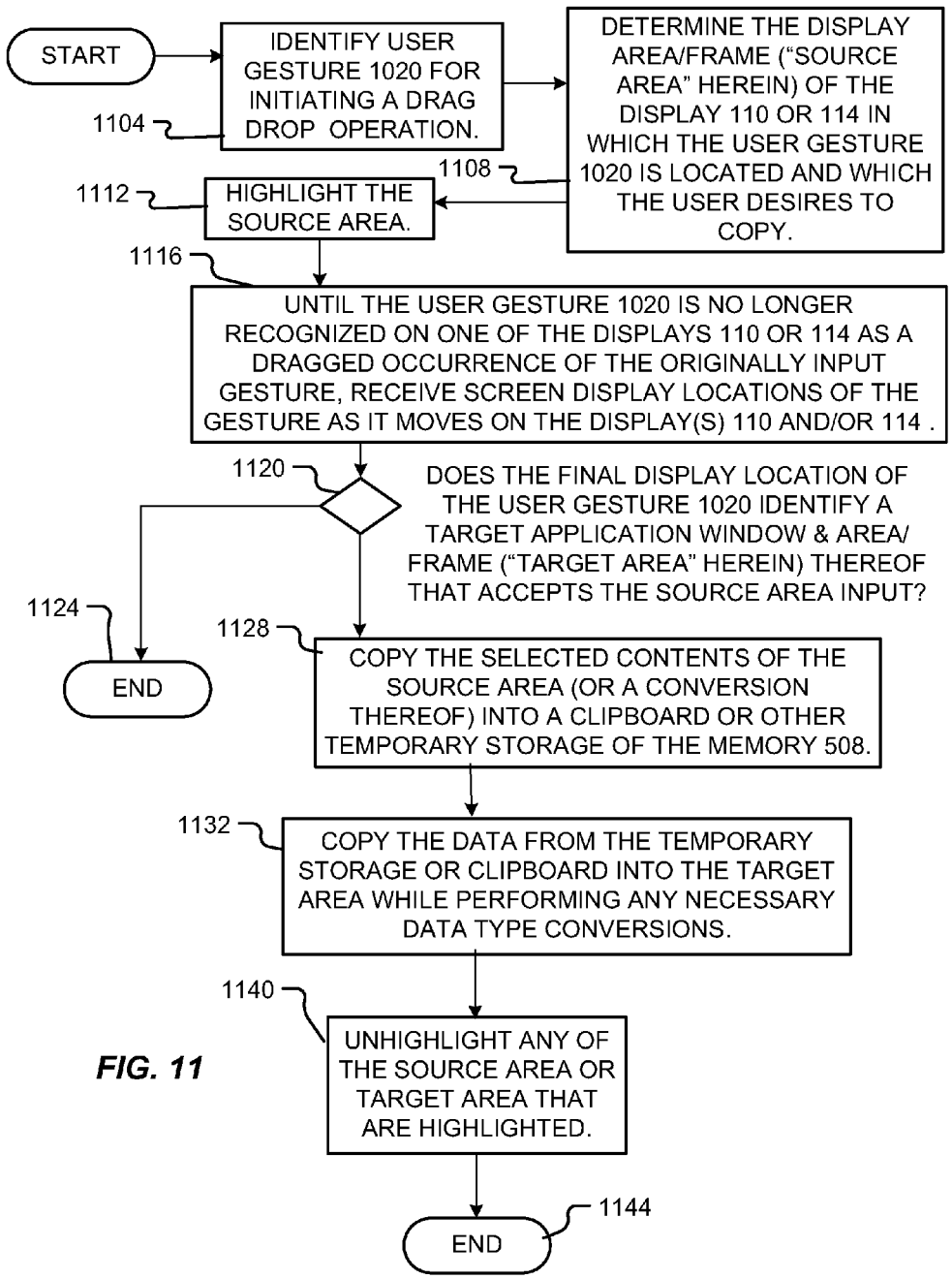
FIG. 11 is a flowchart providing high level steps for performed an embodiment of the drag and drop operation.

The flowchart of FIG. 11 shows illustrative high level steps that may be performed by an embodiment of the device 100 in performing a drag and drop operation as described hereinabove with reference to FIGS. 10A-10D. However, before describing the flowchart steps, it noteworthy that in order for the drag and drop operation to be eligible for being performed wherein the user drag gesture 1020 extends from one of the displays 110, 114 to the other of these displays, the device 100 must in either the open portrait or open landscape state as determined by the MDM 524. Otherwise, the drag and drop operation is confined to a single one of displays 110 or 114. Accordingly, in step 1104, the Gesture Module 576 determines that a user input to one of the displays 110 or 114 is a user gesture (e.g., user gesture 1020) for at least selecting a display area/frame of an application window. In step 1108, upon receiving input from the Gesture Module 576 indicating that such a user gesture has been detected as occurring on one of the displays 110 or 114, the Window Management Module 532 determines a display area/frame ("source area" herein) of the window application where the user gesture was first detected, wherein the source area is determined by the user as the desired area/frame to copy. In performing the step 1108, the Window Management Module 532 may, in one embodiment, receive additional inputs from the Gesture Module 576 for notifying the Window Management Module 532 of additional user gesture input for identifying various display areas/frames in a display hierarchy of such display areas/frames. For example, the user may input the user gesture 1020 upon a displayed picture on a webpage, and the webpage may be initially identified by the Window Management Module 532. Thus, the Window Management Module 532 may cause the webpage (or a frame boundary thereof) to be highlighted to the user thereby indicating that the webpage has been selected for coping. Accordingly, the user may provide an additional user gesture (e.g. a finger tap 400 as described above with reference to FIG. 10B) to indicate that another area/frame of the display is desired to be copied. Accordingly, assuming there is no intermediate display area/frame in a hierarchy that ends in the picture, upon the Window Management Module 532 receiving data from the Gesture Module 576 indicating that the additional user gesture has been input by the user, the MDM selects the picture, and highlights this picture on the display (110 or 114) to confirm to the user the information selected to be copied.

Thus, as indicated in the example of selecting a displayed picture above, the Window Management Module 532 may perform the step 1112 for highlighting the display area/frame that has been selected for copying. Following this step, upon receiving additional input from the Gesture Module 576 regarding (any) movement (or other change) in the user gesture 1020, in step 1116, the Window Management Module 532 receives and stores a display location for each such additional input. Note that previous display locations corresponding to a previous location of the user gesture 1020 may be overwritten with each new display location. Moreover, the Window Management Module 532 may be programmed to create, e.g., a semi-transparent copy (or a non-transparent iconic representation) of the selected information which may be displayed as following beneath the dragging of the user gesture 1020 over the displays 110 and/or 114. Furthermore, for each input the Window Management Module 532 receives of the user gesture 1020 display location, the MDM 524 may in real time: (i) determine a (any) display area/frame identified by the user gesture display location, and once determined, (ii) highlight or otherwise identify on the display(s) 110 and/or 114 such a determined display area/frame (or the border thereof) as being a candidate display area/frame that can accept the selected information in a paste operation. Note that in determining (i) immediately above, if the user gesture display location identifies a hierarchical collection of display areas/frames, then the Window Management Module 532 may determine the lowest ordered (e.g., smallest) display area/frame in the hierarchy that can accept the selected information. Thus, for example, if the content area 1008 of FIG. 10 included a form with entries that can accept user input, then if a first entry was a check box, then if the user gesture 1020 were dragged over this first entry, it would not be identified as appropriate for receiving the selected information, and instead, a higher ordered display area/frame would be determined, e.g., the content area 1008. If, however, a second form entry is determined to be beneath the current location of the user gesture 1020, and this second form entry is able to accept the selected information for the drag and drop operation (e.g., textual webpage input as selected for the drag and drop operation in FIG. 10B), then the area/frame for this second form entry would be identified (e.g., via highlighting) on its display(s) 110 or 114 as a candidate for receiving a paste of the selected information.

Assuming the MDM 524 has informed the Gesture Module 576 that the device 100 is in an open (unfolded) configuration, then when the user gesture 1020 drags off its display 110, 114, the Gesture Module 576 may attempt to correlate a corresponding drag gesture 1020 on the other one of the displays 110, 114. In particular, assuming the device 100 is unfolded (the Gesture Module 576 has been informed of such), the Gesture Module 576 may detect that the gesture 1020 has left its display on a side between the displays 110, 114 (rather than some other side which may be interpreted as a termination of the drag and drop operation). Accordingly, the Gesture Module 576 may wait a predetermined time of, e.g., at most 0.5 seconds for detecting a corresponding drag gesture 1020 near the border of the other of the displays 110, 114, wherein this border is closest to the border of the display 110, 114 from which the drag gesture 1020 ceased to be detected. Thus, the device 100 can track the user drag gesture 1020 from one of the displays 110, 114 to the other of the displays, wherein the drag gesture 1020 substantially continuously traverses from one of the displays 110, 114 to the other display.

In step 1120, upon the Window Management Module 532 receiving input from the Gesture Module 576 that the user gesture 1020 has ceased to be detected on one of the displays 110 or 114, the MDM determines whether there is an area/frame underneath the last stored display location of the user gesture 1020, wherein this area/frame (the "target area" herein) accepts input as provided by the source area. If not, then there is no appropriate area/frame in which to paste the selected information, and accordingly the process corresponding to flowchart of FIG. 11 terminates at 1124 without performing the drag and drop operation. Note that a user can use this technique to safely terminate the drag and drop operation without causing a paste of the selected information. That is, the user could terminate the drag of the user gesture 1030 over a display location that does not identify an area/frame of the displays 110 or 114 that accepts the selected information of the source area as input. However, in an additional/alternative embodiment, a user may terminate the drag and drop operation without completing the paste by accelerating the user gesture 1030 off the displays 110 and 114.

If, on-the-other-hand, step 1120 results in identifying a display area/frame of an application window that can accept the source area input, then in step 1128, the selected contents of source area is copied to a temporary data storage (not separately shown) of memory 508 (e.g., a "clipboard" as one skilled in the art will understand).

Subsequently, in step 1132, this source area information that is newly entered in the temporary data storage is then automatically (e.g., without requiring user input) copied into the target area by the Window Manager Module 532. Note that for applications 564 in which, e.g., text, tables, pictures, videos, and/or combinations thereof may be input, such applications are likely to be configured when installed in the device 100 so that these applications can accept input from a clipboard as part of the device's application support services provided by the application manager 562. Moreover, note that the paste of the source area information into the target may require data type conversions so that an appropriate version of the selected content of the source area can be pasted into the target area. For example, if the selected content of the source area is Microsoft Word® text, and the target area the Google Chrome® then the selected content may need to be converted to a "rich text" format as one skilled in the art will understand.

Subsequently, in step 1140, if there are highlighted portions of the displays 110,114 due to the present drag and drop operation, such highlighting is removed or turned off by the Window Management Module 532. In particular, the Window Management Module 532 may turn off any highlighting of the source and target areas. Subsequently, the flowchart of FIG. 11 terminates at 1144.

The exemplary systems and methods of this disclosure have been described in relation to processing performed for the gravity drop and reverse gravity drop. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing a drag and drop operation using user finger gesture input to a device having a plurality of touch sensitive displays, comprising:
    receiving an input of a first finger gesture to a first of the touch sensitive displays;
    determining a source area of the first touch sensitive display where the first finger gesture input was detected;
    identifying data within the source area to be copied;
    receiving an input of a finger drag gesture for identifying a target area of a second of the touch sensitive displays into which the data from the source data is to be copied, wherein the finger drag gesture extends across a boundary between the first touch sensitive display and the second touch sensitive display, wherein the first and second touch sensitive displays are foldable relative to one another along the boundary;
    wherein the target area corresponds to a location on the second touch sensitive display where the drag gesture is last detected before it ceases to be detected;
    changing a display of the target area for identifying the target area to a user as able to receive the data from the source area; and
    copying the data into the target area.

2. The method of claim 1, wherein at least one of the first and second touch sensitive displays includes a capacitive touch sensitive area for receiving the finger gesture input.

3. The method of claim 1, further including a step of outputting on the first touch sensitive display a display change for identifying the source area to the user.

4. The method of claim 3, further including a step of selecting the target area identified by the location on the display where the drag gesture is last detected before it ceases to be detected.

5. The method of claim 4, wherein the step of selecting includes selecting a display area that accepts a clipboard input, wherein the data from the source area is copied to the clipboard, and copied from the clipboard to the target area.

6. The method of claim 1, further including selecting the source area by identifying a location on the first touch sensitive display for the first finger gesture input, and changing a display presentation of the source area.

7. The method of claim 1, wherein the first finger gesture includes pressing and holding two fingers against the display for a predetermined time for identifying a display location of the source area.

8. The method of claim 7, wherein the finger drag gesture includes dragging the finger gesture substantially continuously from the display location to the location on the second touch sensitive display on the touch sensitive display device.

9. The method of claim 1, further including identifying to the user one or more display areas as the user inputs a portion of the finger drag gesture over each of the one or more display areas, wherein each of the one or more display areas are determined to be acceptable for pasting the data therein.

10. A non-transitory computer readable medium for performing a drag and drop operation using user finger gesture inputs to first and second display screens of a device, wherein the device includes a folding mechanism attached to each of the first and second display screens for providing the first and seconds display screens in a folded configuration wherein the first and second display screens face in opposite directions, and in an unfolded configuration wherein the first and second display screens face in a substantially same direction, comprising:

machine instructions for performing the following steps:

determining that the first and second display screens are in the unfolded configuration;

receiving an input of a first finger gesture to the first display screen;

determining a source area of the first display screen where the first finger gesture was detected;

identifying data within the source area to be copied;

receiving an input of a finger drag gesture for identifying a target area of the second display screen into which the data from the source data is to be copied, wherein the finger drag gesture extends across a boundary between the first display screen and the second display screen, wherein the first and second display screens are foldable relative to one another along the boundary;

wherein the target area corresponds to a location on the second display screen where the drag gesture is last detected before it ceases to be detected;

changing a display of the target area for identifying the target area to a user as able to receive the data from the source area; and copying the data into the target area.

11. The non-transitory computer readable medium of claim 10, wherein the source area and the target area each correspond to a displayed portion of a different application window;

wherein each of the different application windows corresponds to a different software application installed on the device.

12. The non-transitory computer readable medium of claim 10, wherein each of the software applications is operable on the device independently of each of the other of the software applications.

13. The non-transitory computer readable medium of claim 10, wherein the step of copying includes copying the data from the source area to a clipboard, and then automatically inputting corresponding clipboard data to the target area.

14. The non-transitory computer readable medium of claim 10, further including highlighting the source area prior to a performance of the finger drag gesture.

15. A hand-held device for performing a drag and drop operation using user gestures as inputs, comprising:

first and second display screens of the device, wherein the device includes a folding mechanism attached to each of the first and second display screens for providing the first and second display screens in a folded configuration wherein the first and second display screens face in opposite directions, and in an unfolded configuration wherein the first and second display screens face in a substantially same direction;

a display manager for determining whether the first and second display screens are in an unfolded configuration or a folded configuration;

a gesture interpreter for interpreting an input of a first gesture to the first display screen for identifying a first area, and subsequently interpreting an input of a second gesture for selecting a second area, wherein the first area includes the second area;

a window manager for receiving: (i) first data from the gesture interpreter, the first data includes location data indicative of a location on the first display screen of the first gesture input, and (ii) second data from the gesture interpreter, the second data for identifying the second area;

wherein the window manager uses the location data for determining the first area, and changing a display presentation of the first area for identifying the first area to a user;

wherein, after the change in display presentation of the first area, the gesture interpreter receives the second gesture input, and the window manager uses the second data to change a display presentation of the second area for determining the second area to the user as a source area and identifying data within the source area for the drag and drop operation;

wherein, when the window manager receives input from the gesture interpreter of a drag gesture being input for performing a drag for the source area, a corresponding image to be dragged is generated;

wherein the window manager uses a display screen location from the drag gesture for identifying a target area of the second display screen into which data from the source area is to be copied, wherein the target area corresponds to a location of the second display screen where the drag gesture is last detected by the gesture interpreter before the drag gesture ceases to be detected by the gesture interpreter;

wherein the data from the source area is copied into the target area.

16. The hand-device of claim 15, wherein the source area is included in a display of a first application, and the target area is included in a display of a different second application.

17. The hand-device of claim 15, wherein the first gesture includes pressing and holding a finger against the first display screen for a predetermined time for identifying a display location for the first area.

18. The hand-device of claim 17, wherein the drag gesture includes dragging the first gesture on each of the first and second display screens substantially continuously across a boundary therebetween.

19. The hand-device of claim 15 further including an application support service for inputting the data from the source area into a clipboard, and then automatically inputting corresponding clipboard data to the target area.

20. The hand-device of claim 15, wherein the window manager highlights the source area prior to a performance of the drag gesture.

* * * * *

UNITED STATES PATENT AND TRADEMARK OFFICE
CERTIFICATE OF CORRECTION

PATENT NO. : 8,527,892 B2  Page 1 of 1
APPLICATION NO. : 13/247949
DATED : September 3, 2013
INVENTOR(S) : Sanjiv Sirpal et al.

It is certified that error appears in the above-identified patent and that said Letters Patent is hereby corrected as shown below:

In the Claims

Column 38, line 17, replace "configuration" with --configuration,--
Column 38, line 19, replace "configuration" with --configuration,--

Signed and Sealed this
Sixth Day of May, 2014

Michelle K. Lee
*Deputy Director of the United States Patent and Trademark Office*